(12) United States Patent
Zhu et al.

(10) Patent No.: US 12,211,185 B2
(45) Date of Patent: Jan. 28, 2025

(54) COMPUTER-IMPLEMENTED IMAGE-PROCESSING METHOD, IMAGE-ENHANCING CONVOLUTIONAL NEURAL NETWORK, AND COMPUTER PRODUCT

(71) Applicant: BOE Technology Group Co., Ltd., Beijing (CN)

(72) Inventors: Dan Zhu, Beijing (CN); Guannan Chen, Beijing (CN); Ran Duan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 329 days.

(21) Appl. No.: 17/434,729

(22) PCT Filed: Nov. 27, 2020

(86) PCT No.: PCT/CN2020/132296
§ 371 (c)(1),
(2) Date: Jun. 2, 2022

(87) PCT Pub. No.: WO2022/110027
PCT Pub. Date: Jun. 2, 2022

(65) Prior Publication Data
US 2023/0401679 A1 Dec. 14, 2023

(51) Int. Cl.
*G06T 5/73* (2024.01)
*G06N 3/045* (2023.01)
(Continued)

(52) U.S. Cl.
CPC .............. *G06T 5/73* (2024.01); *G06N 3/045* (2023.01); *G06N 3/0464* (2023.01); *G06N 3/08* (2013.01);
(Continued)

(58) Field of Classification Search
CPC ............. G06T 5/73; G06T 2207/20081; G06T 2207/20084; G06T 2207/20192;
(Continued)

(56) References Cited

U.S. PATENT DOCUMENTS

2017/0032222 A1  2/2017  Sharma et al.
2017/0352100 A1* 12/2017  Shreve .................... G06T 7/168
(Continued)

FOREIGN PATENT DOCUMENTS

CN  105825484 A  8/2016
CN  107944442 A  4/2018
(Continued)

OTHER PUBLICATIONS

International Search Report & Written Opinion mailed Aug. 27, 2021, regarding PCT/CN2020/132296.
(Continued)

*Primary Examiner* — Akwasi M Sarpong
*Assistant Examiner* — Michael L Burleson
(74) *Attorney, Agent, or Firm* — Intellectual Valley Law, P.C.

(57) ABSTRACT

A computer-implemented image-processing method is provided. The computer-implemented image-processing method includes obtaining a pair of training samples including a training image having a first degree of sharpness and a reference image having a second degree of sharpness, the second degree greater than the first degree, at least portions of the training image and the reference image in a same pair having same contents; inputting the training image to the image-enhancing convolutional neural network to generate a training enhanced image; inputting the training enhanced image into an edge detector; generating, by the edge detector, a plurality of first edge maps; inputting the reference image into the edge detector; generating, by the edge detec-
(Continued)

tor, a plurality of second edge maps; and tuning parameters in the image-enhancing convolutional neural network to minimize at least the one or more first losses and a second loss.

18 Claims, 10 Drawing Sheets

(51) Int. Cl.
    *G06N 3/0464*     (2023.01)
    *G06N 3/08*     (2023.01)
(52) U.S. Cl.
    CPC ............... *G06T 2207/20081* (2013.01); *G06T 2207/20084* (2013.01); *G06T 2207/20192* (2013.01)
(58) Field of Classification Search
    CPC ........ G06T 5/60; G06N 3/045; G06N 3/0464; G06N 3/08
    See application file for complete search history.

(56) References Cited

U.S. PATENT DOCUMENTS

| | | | |
|---|---|---|---|
| 2019/0220746 A1* | 7/2019 | Liu | ............ G06N 3/084 |
| 2019/0244331 A1 | 8/2019 | Gu et al. | |
| 2020/0245969 A1* | 8/2020 | Tung | ............ A61B 8/5207 |
| 2021/0233214 A1 | 7/2021 | Liu et al. | |
| 2022/0108425 A1* | 4/2022 | Chen | ............ G06T 3/4046 |

FOREIGN PATENT DOCUMENTS

| | | |
|---|---|---|
| CN | 108492269 A | 9/2018 |
| CN | 109003231 A | 12/2018 |
| CN | 109345609 A | 2/2019 |
| CN | 109816612 A | 5/2019 |
| CN | 110675336 A | 1/2020 |
| CN | 110782399 A | 2/2020 |
| CN | 111028177 A | 4/2020 |
| CN | 111161191 A | 5/2020 |
| WO | 2018227105 A1 | 12/2018 |

OTHER PUBLICATIONS

S. Xie et al., "Holistically-Nested Edge Detection", 2015 IEEE International Conference on Computer Vision, arXiv:1504.06375v2 [cs.CV] Oct. 4, 2015.
Z. Fu et al., "Edge-Aware Deep Image Deblurring", arXiv:1907.02282v2 [cs.CV] Jul. 11, 2020.
H. Su et al., "Feature Extraction of Cow Edge Image Based on Holistically-Nested Edge Detection Network", Journal of Chinese Agricultural Mechanization, vol. 40 No. 12, Dec. 2019, pp. 144-148.
F. Qiu et al., "Blind Image Deblurring with Reinforced Use of Edges", Journal of Image and Graphics, 2019, 24 (06), pp. 847-858.
Y. Guo et al., "Blind Motion Deblurring Algorithm Based on Gradient Domain and Deep Learning", Research and Exploration in Laboratory, vol. 38 No. 6, Jun. 2019, pp. 4-8.
T. Nimisha et al., "Blur-Invariant Deep Learning for Blind-Deblurring", 2017 IEEE International Conference on Computer Vision, pp. 4762-4770.
A. Ignatov et al., "WESPE: Weakly Supervised Photo Enhancer for Digital Cameras", 2018 IEEE Conference on Computer Vision abd Pattern Recognition Workshops, arXiv: 1709.01118v2 [cs.CV] Mar. 3, 2018, pp. 804-813.
S. Nah et al., "Deep Multi-scale Convolutional Neural Network for Dynamic Scene Deblurring", arXiv: 1612.02177v2 [cs.CV] May 7, 2018, pp. 1-21.

\* cited by examiner

COMPUTER-IMPLEMENTED IMAGE-PROCESSING METHOD, IMAGE-ENHANCING CONVOLUTIONAL NEURAL NETWORK, AND COMPUTER PRODUCT

CROSS-REFERENCE TO RELATED APPLICATION

This application is a national stage application under 35 U.S.C. § 371 of International Application No. PCT/CN2020/132296, filed Nov. 27, 2020, the contents of which are incorporated by reference in the entirety.

TECHNICAL FIELD

The present invention relates to artificial intelligence, more particularly, to a computer-implemented image-processing method, an image-enhancing convolutional neural network, and a computer product.

BACKGROUND

The image enhancement is a commonly used image processing technique to improve quality of an image, and viewing experience of a user. For example, when an image is overexposed, it looks brighter overall, and the contrast of the overexposed image is low, resulting that the scene in the overexposed image cannot be distinguished easily. The image enhancement can be used in the overexposed image to enhance the contrast of the overexposed image.

SUMMARY

In one aspect, the present disclosure provides a computer-implemented image-processing method, comprising inputting a first image into a trained image-enhancing convolutional neural network; processing the first image by the trained image-enhancing convolutional neural network to obtain a second image, the second image having a sharpness greater than a sharpness of the first image; wherein the trained image-enhancing convolutional neural network is obtained by training an image-enhancing convolutional neural network; wherein training the image-enhancing convolutional neural network comprises obtaining a pair of training samples including a training image having a first degree of sharpness and a reference image having a second degree of sharpness, the second degree greater than the first degree, at least portions of the training image and the reference image in a same pair having same contents; inputting the training image to the image-enhancing convolutional neural network to generate a training enhanced image; inputting the training enhanced image into an edge detector; generating, by the edge detector, a plurality of first edge maps; inputting the reference image into the edge detector; generating, by the edge detector, a plurality of second edge maps; calculating one or more first losses based on the plurality of first edge maps and the plurality of second edge maps, a respective one of the one or more first losses being calculated based on a respective one of the plurality of first edge maps and a respective one of the plurality of second edge maps, the respective one of the plurality of first edge maps and the respective one of the plurality of second edge maps having a same scale; comparing the training enhanced image with the reference image to calculate a second loss; and tuning parameters in the image-enhancing convolutional neural network to minimize at least the one or more first losses and the second loss.

Optionally, the edge detector is an edge detection neural network comprises N number of edge map generators respectively configured to generate N number of edge maps; wherein a n-th edge map generator of the N number of edge map generators comprises a n-th group of convolutional layers, and a n-th side layer configured to output a n-th edge map of a same scale, $1 \leq n \leq N$; and when $1 \leq n < N$, the n-th edge map generator further comprises a n-th down sampling layer.

Optionally, generating, by the edge detector, the plurality of first edge maps comprises generating a n-th first edge map of a same scale by the n-th edge map generator; wherein generating the n-th first edge map comprises inputting a (n−1)-th first image into the n-th group of convolutional layers; processing the (n−1)-th first image by the n-th group of convolutional layers to generate a n-th processed first image; down-sampling the n-th processed first image by the n-th down-sampling layer to generate a n-th down-sampled first image; processing the n-th processed first image by the n-th side layer to generate the n-th first edge map of the same scale; and when n<N, inputting the n-th down-sampled first image into a (n+1)-th group of convolutional layers; wherein the (n−1)-th first image is the training enhanced image when n=1; and the (n−1)-th first image is a (n−1)-th down-sampled first image when n>1.

Optionally, generating, by the edge detector, the plurality of second edge maps comprises generating a n-th second edge map of a same scale by the n-th edge map generator; wherein generating the n-th second edge map comprises inputting a (n−1)-th second image into the n-th group of convolutional layers; processing the (n−1)-th second image by the n-th group of convolutional layers to generate a n-th processed second image; down-sampling the n-th processed second image by the n-th down-sampling layer to generate a n-th down-sampled second image; processing the n-th processed second image by the n-th side layer to generate the n-th second edge map of the same scale; and when n<N, inputting the n-th down-sampled second image into a (n+1)-th group of convolutional layers; wherein the (n−1)-th second image is the reference image when n=1; and the (n−1)-th second image is a (n−1)-th down-sampled second image when n>1.

Optionally, the n-th group of convolutional layers comprises multiple convolutional layers and multiple active layers, each of the multiple convolutional layers comprises (p×64) number of 3×3 convolutional kernels, p being a positive integer; and the n-th side layer comprises a convolutional layer and a deconvolutional layer sequentially connected.

Optionally, the edge detector is an edge detection neural network comprising a first group of convolutional layers, a first pooling layer, a first side layer, a second group of convolutional layers, a second pooling layer, a second side layer, a third group of convolutional layers, a third pooling layer, a third side layer, a fourth group of convolutional layers, a fourth pooling layer, a fourth side layer, a fifth group of convolutional layers, and a fifth side layer; wherein the first group of convolutional layers comprises two convolutional layers and two active layers, each of the two convolutional layers comprises 64 number of 3×3 convolutional kernels; the second group of convolutional layers comprises two convolutional layers and two active layers, each of the two convolutional layers comprises 128 number of 3×3 convolutional kernels; the third group of convolutional layers comprises three convolutional layers and three active layers, each of the three convolutional layers comprises 256 number of 3×3 convolutional kernels; the fourth group of convolutional layers comprises three convolutional layers and three active layers, each of the three convolutional layers comprises 512 number of 3×3 convolutional kernels; and the fifth group of convolutional layers comprises three convolutional layers and three active layers, each of the three convolutional layers comprises 512 number of 3×3 convolutional kernels.

Optionally, calculating the one or more first losses based on the plurality of first edge maps and the plurality of second edge maps comprises calculating a n-th loss based on a n-th first edge map of a same scale and a n-th second edge map of a same scale, 1≤n≤N.

Optionally, the one or more first losses comprises $\Sigma_1^N Loss_n$; wherein $Loss_n$ stands for the n-th loss.

Optionally, calculating the n-th loss comprises calculating one or more of a L2 loss, a L1 loss, and a MSE loss; wherein the L2 loss is calculated using a L2 loss function expressed as sum $(|Y-f(x)|^2)$; wherein Y stands for a value of a pixel in the nth second edge map, f(x) stands for a value of a pixel in the n-th first edge map, and sum stands for a summation operation.

Optionally, calculating the n-th loss comprises calculating one or more of a L2 loss, a L1 loss, and a MSE loss; wherein the L1 loss is calculated using a L1 loss function expressed as sum $(|Y-f(x)|)$; wherein Y stands for a value of a pixel in the n-th second edge map, f(x) stands for a value of a pixel in the n-th first edge map, and sum stands for a summation operation.

Optionally, calculating the n-th loss further comprises calculating one or more of a L2 loss, a L1 loss, and a MSE loss; wherein the MSE loss is calculated using a MSE loss function expressed as avg $(|Y-f(x)|^2)$; wherein Y stands for a value of a pixel in the n-th second edge map, f(x) stands for a value of a pixel in the nth first edge map, and avg stands for an averaging operation.

Optionally, calculating the second loss comprises calculating one or more of a L2 loss, a L1 loss, and a MSE, loss; wherein the L2 loss is calculated using a L2 loss function expressed as sum $(|Y-f(x)|^2)$; wherein Y stands for a value of a pixel in the reference image, f(x) stands for a value of a pixel in the training enhanced image, and sum stands for a summation operation.

Optionally, calculating the second loss comprises calculating one or more of a L2 loss, a L1 loss, and a MSE loss; wherein the L1 loss is calculated using a L1 loss function expressed as sum $(|Y-f(x)|)$ wherein Y stands for a value of a pixel in the reference image, f(x) stands for a value of a pixel in the training enhanced image, and sum stands for a summation operation.

Optionally, calculating the second loss comprises calculating one or more of a L2 loss, a L1 loss, and a MSE loss; wherein the MSE loss is calculated using a MSE loss function expressed as avg $(|Y-f(x)|^2)$; wherein Y stands for a value of a pixel in the reference image, f(x) stands for a value of a pixel in the training enhanced image, and sum stands for a summation operation.

Optionally, the computer-implemented method further comprises reiterating training the image-enhancing convolutional neural network using a different pair of a training image and a reference image.

In another aspect, the present disclosure provides an image-enhancing convolutional neural network, trained by obtaining a pair of training samples including a training image having a first degree of sharpness and a reference image having a second degree of sharpness, the second degree greater than the first degree, at least portions of the training image and the reference image in a same pair having same contents; inputting the training image to the image-enhancing convolutional neural network to generate a training enhanced image; inputting the training enhanced image into an edge detector; generating, by the edge detector, a plurality of first edge maps; inputting the reference image into the edge detector; generating, by the edge detector, a plurality of second edge maps; calculating one or more first losses based on the plurality of first edge maps and the plurality of second edge maps, a respective one of the one or more first losses being calculated based on a respective one of the plurality of first edge maps and a respective one of the plurality of second edge maps, the respective one of the plurality of first edge maps and the respective one of the plurality of second edge maps having a same scale; comparing the training enhanced image with the reference image to calculate a second loss; and tuning parameters in the image-enhancing convolutional neural network to minimize at least the one or more first losses and the second loss.

Optionally, the image-enhancing convolutional neural network comprises a plurality of encoding modules; a plurality of decoding modules; and at least one concatenation between a respective one of the plurality of encoding modules and a respective one of the plurality of decoding modules; wherein a respective one of the plurality of encoding modules comprises a down-sampling convolutional layer, and a plurality of first residual blocks arranged in series; a respective one of the plurality of decoding modules comprises a plurality of second residual blocks arranged in series, and an up-sampling convolutional layer.

In another aspect, the present disclosure provides an apparatus for training an image-enhancing convolutional neural network configured to enhance an original image, comprising a memory; and one or more processors; wherein the memory and the one or more processors are connected with each other; and the memory stores computer-executable instructions for controlling the one or more processors to obtain a pair of training samples including a training image having a first degree of sharpness and a reference image having a second degree of sharpness, at least portions of the training image and the reference image in a same pair having same contents; input the training image to the image-enhancing convolutional neural network to generate a training enhanced image; input the training enhanced image into an edge detector; generate, by the edge detector, a plurality of first edge maps; input the reference image into the edge detector; generate, by the edge detector, a plurality of second edge maps; calculate one or more first losses based on the plurality of first edge maps and the plurality of second edge maps, a respective one of the one or more first losses being calculated based on a respective one of the plurality of first edge maps and a respective one of the plurality of second edge maps, the respective one of the plurality of first edge maps and the respective one of the plurality of second edge maps having a same scale; and tune parameters in the image-enhancing convolutional neural network to minimize at least the one or more first losses.

In another aspect, the present disclosure provides a computer-program product, for training an image-enhancing convolutional neural network configured to enhance an original image, comprising a non-transitory tangible computer-readable medium having computer-readable instructions thereon, the computer-readable instructions being executable by a processor to cause the processor to perform obtaining a pair of training samples including a training image having a first degree of sharpness and a reference image having a second degree of sharpness, at least portions of the training image and the reference image in a same pair having same contents; inputting the training image to the image-enhancing convolutional neural network to generate a training enhanced image; inputting the training enhanced image into an edge detector; generating, by the edge detector, a plurality of first edge maps; inputting the reference image into the edge detector; generating, by the edge detector, a plurality of second edge maps; calculating one or more first losses based on the plurality of first edge maps and the plurality of second edge maps, a respective one of the one or more first losses being calculated based on a respective one of the plurality of first edge maps and a respective one of the plurality of second edge maps, the respective one of the plurality of first edge maps and the respective one of the plurality of second edge maps having a same scale; and tuning parameters in the image-enhancing convolutional neural network to minimize at least the one or more first losses.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
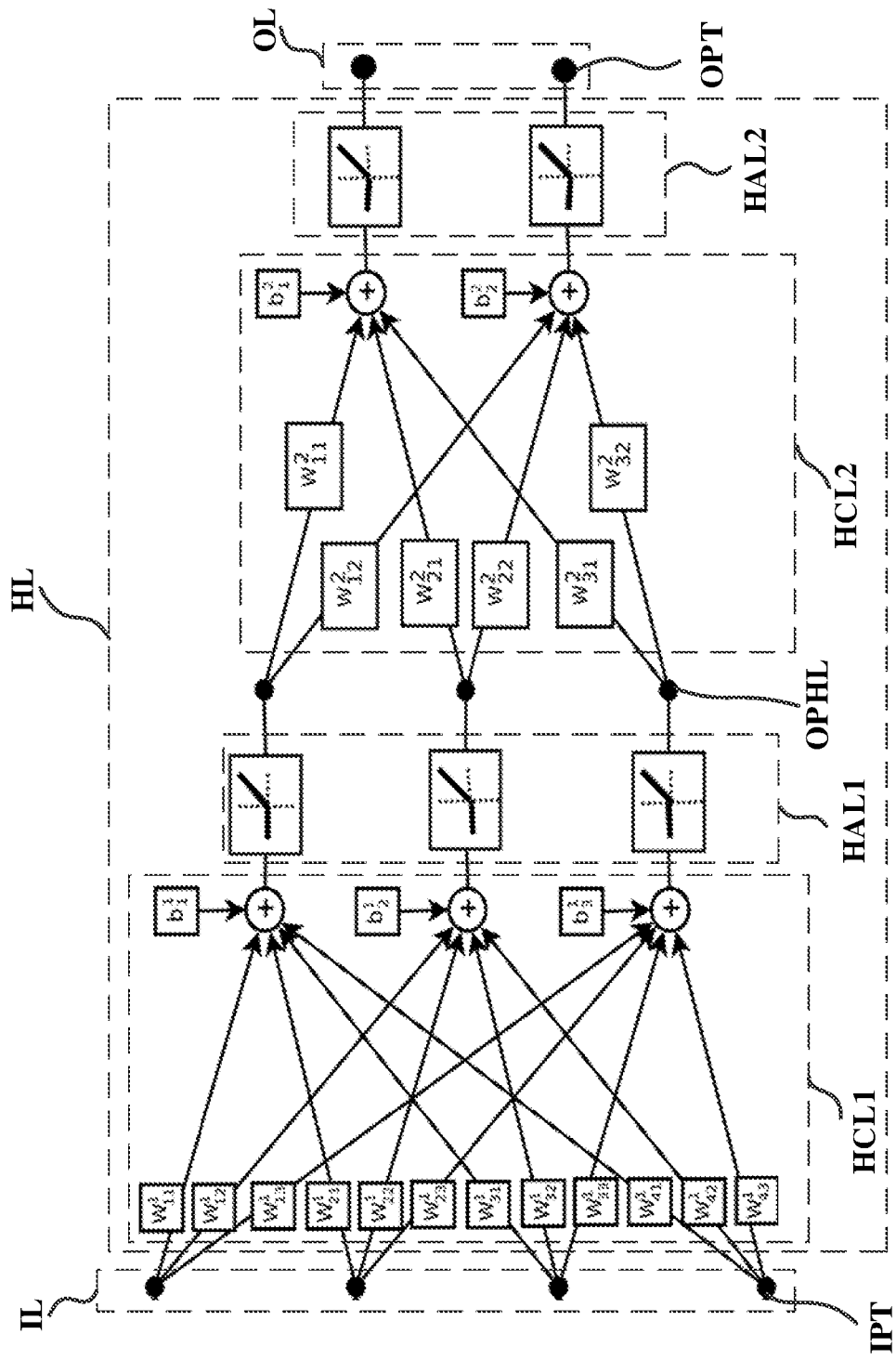
FIG. 1 is a schematic diagram of a convolutional neural network in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a computer-implemented method of training an image-enhancing convolutional neural network, an image-enhancing convolutional neural network, and a computer product that substantially obviate one or more of the problems due to limitations and disadvantages of the related art. In one aspect, the present disclosure provides a computer-implemented image-processing method. In some embodiments, the computer-implemented method includes inputting a first image into a trained image-enhancing convolutional neural network; processing the first image by the trained image-enhancing convolutional neural network to obtain a second image, the second image having a sharpness greater than a sharpness of the first image. Optionally, the trained image-enhancing convolutional neural network is obtained by training an image-enhancing convolutional neural network. Optionally, training the image-enhancing convolutional neural network includes obtaining a pair of training samples including a training image having a first degree of sharpness and a reference image having a second degree of sharpness, the second degree greater than the first degree, at least portions of the training image and the reference image in a same pair having same contents; inputting the training image to the image-enhancing convolutional neural network to generate a training enhanced image; inputting the training enhanced image into an edge detector; generating, by the edge detector, a plurality of first edge maps; inputting the reference image into the edge detector; generating, by the edge detector, a plurality of second edge maps; calculating one or more first losses based on the plurality of first edge maps and the plurality of second edge maps, a respective one of the one or more first losses being calculated based on a respective one of the plurality of first edge maps and a respective one of the plurality of second edge maps, the respective one of the plurality of first edge maps and the respective one of the plurality of second edge maps having a same scale; comparing the training enhanced image with the reference image to calculate a second loss; and tuning parameters in the image-enhancing convolutional neural network to minimize at least the one or more first losses and the second loss.

As used herein, the term "scale" refers to one or any combinations of three dimensions of an image, including one or any combinations of a width of the image, a height of the image, and a depth of the image. In one example, the scale of an image (e.g., a feature map, a data, a signal) refers to a "volume" of an image, which includes the width of the image, the height of the image, and the depth of the image. In another example, spatial scale of an image (e.g., a feature map, a data, a signal) refers to a width and length of the image, e.g., width×length.

As used herein, the term "sharpness" refers to the contrast between image objects, for example, the sharpness of an image contour and associated fine shadow pattern in an image. The higher the clarity, the better the perception to the human eye. The sharpness of the output image is higher than the clarity of the input image, for example, by processing the input image using the image processing methods provided by the present disclosure, such as de-noising and; or de-blurring, or resolution enhancement processing, so that the output image obtained after the processing is sharper than the input image. In one example, a degree of sharpness may be measured by mathematical calculations utilizing a Modulation Transfer Function method.

FIG. 1 is a schematic diagram of a convolutional neural network in some embodiments according to the present disclosure. Referring to FIG. 1, a convolutional neural network (CNN) can be used in fields including image recognition, face recognition, text recognition, animal recognition, and image processing. For example, the convolutional neural network is used to process images. An input and an output of the convolutional neural network are images. Convolutional kernels of the convolutional neural network replace weights of scalars. In some embodiments, the convolutional neural network shown in FIG. 1 only has three layers. Optionally, the convolutional neural network includes an input layer IL, a hidden layer HL, and an output layer OL. Optionally, four inputs IPT are input in the input layer IL. Three outputs OPHL are output from the hidden layer HL. Two outputs OPT are outputted from the output layer OL. So, the convolutional neural network can output two output images (e.g. Two outputs OPT). For example, the four inputs IPT input in the input layer IL are four images, or four features of one image. The three outputs OPHL output from the hidden layer HL can be three feature maps of the four images, or three feature maps of the four features of one images input in the input layer IL.

As used herein, the term "convolutional neural network" refers to a deep feed-forward artificial neural network. Optionally, a convolutional neural network includes a plurality of convolutional layers, a plurality of up-sampling layers, and a plurality of down-sampling layers. For example, a respective one of the plurality of convolutional layers can process an image. An up-sampling layer and a down-sampling layer can change a size of an input image to a size corresponding to a certain convolutional layer. The output from the up-sampling layer or the down-sampling layer can then be processed by a convolutional layer of a corresponding size. This enables the convolutional layer to add or extract a feature having a size different from that of the input image.

As used herein, the term "convolutional kernel" refers to a two-dimensional matrix used in a convolution process. Optionally, a respective one item of a plurality items in the two-dimensional matrix has a certain value.

As used herein, the term "convolution" refers to a process of processing an image. A convolutional kernel is used for a convolution. For, each pixel of an input image has a value, a convolution kernel starts at one pixel of the input image and moves over each pixel in an input image sequentially. At each position of the convolutional kernel, the convolutional kernel overlaps a few pixels on the image based on the scale of the convolution kernel. At a position of the convolutional kernel, a value of one of the few overlapped pixels is multiplied by a respective one value of the convolutional kernel to obtain a multiplied value of one of the few overlapped pixels. Subsequently, all multiplied values of the overlapped pixels are added to obtain a sum corresponding to the position of the convolutional kernel on the input image. By moving the convolutional kernel over each pixel of the input image, all the sums corresponding to all the position of the convolutional kernel are collected and output to form an output image. In one example, a convolution may extract different features of the input image using different convolution kernels. In another example, a convolution process may add more features to the input image using different convolution kernels.

As used herein, the term "convolutional layer" refers to a layer in a convolutional neural network. The convolutional layer is used to perform convolution on an input image to obtain an output image. Optionally, different convolution kernels are used to performed different convolutions on the same input image. Optionally, different convolution kernels are used to performed convolutions on different parts of the same input image. Optionally, different convolution kernels are used to perform convolutions on different input images, for example, multiple images are inputted in a convolutional layer, a respective convolutional kernel is used to perform a convolution on an image of the multiple images. Optionally, different convolution kernels are used according to different situations of the input image.

Referring to FIG. 1, in some embodiments, the hidden layer HL includes a first hidden convolutional layer HCL1 and a second hidden convolutional layer HCL2. Optionally, the first hidden convolutional layer HCL1 and the second hidden convolutional layer HCL2 both has weights $w_{ij}^k$ and biases $b_i^k$. Weights $w_{ij}^k$ represent convolutional kernels. Biases $b_i^k$ are scalars added to outputs of convolutional layers. k represents a k-th input layer of the convolutional neural network. i represents a i-th input image of a plurality of input images input in a respective one of the input layer. j represents a j-th output of a plurality of outputs obtained from processing a respective one of the plurality of input images. k, i, j are positive integers. For example, the first hidden convolutional layer HCL1 includes a first group of convolutional kernels (e.g. $w_{ij}^1$), and a first group of weights (e.g. $w_{ij}^1$). The second hidden convolutional layer HCL2 includes a second group of convolutional kernels (e.g. $w_{ij}^2$), and a second group of weights (e.g. $b_i^2$). In general, each convolutional layer include hundreds of convolutional kernels. For example, in a deep convolutional neural network, a hidden layer of the deep convolutional neural network includes at least five convolutional layers.

Referring to FIG. 1, the hidden layer HL of the convolutional neural network further includes a first hidden active layer HAL1, and a second hidden active layer HAL2. The first hidden active layer HAL1 is between the first hidden convolutional layer HCL1 and the second hidden convolutional layer HCL2. The second hidden active layer HAL2 is sequentially after the second hidden convolutional layer HCL2. Optionally, an active layer (e.g. the first hidden active layer HAL1, the second hidden active layer HAL2) include activation functions. The active functions are used to add non-linear elements to the convolutional neural network, so that the convolutional neural network can effectively solve a relatively complicated problem.

As used herein, the term "active layer" refers to a layer in a convolutional neural network. An active layer can perform a non-linear mapping on an output signal output from a convolutional laver. Various functions may be used in an active laver. Examples of functions suitable for being adopted in an active layer include, but are not limited to a rectified linear units (ReLU) function, a sigmoid function, and a hyperbolic tangent function (e.g. a tanh function). In one example, an active layer is not included in a convolutional layer. In another example, a convolutional layer includes an active layer. For example, the first hidden convolutional layer HCL1 includes the first hidden active layer HAL1. The second hidden convolutional layer HCL2 includes the second hidden active layer HAL2.

In some embodiments, in the first hidden convolutional layer HCL1, the first group of convolutional keels $w_{ij}^1$ and the first group of weights $b_i^1$ are applied to a respective one of the four input IPT to generate a plurality of outputs from the first hidden convolutional layer HCL1. The plurality of outputs from the first hidden convolutional layer HCL1 are processed by the first hidden active layer HAL1 to generate a plurality of outputs from the first hidden active layer HAL1.

In some embodiments, in the second hidden convolutional layer HCL2, the second groups of convolutional kernels $w_{ij}^2$ and the second group of weights $b_i^2$ are applied to a respective one of the plurality of outputs from the first hidden active layer HAL1 to generate a plurality of outputs from the second hidden convolutional layer HCL2. The plurality of outputs from the second hidden convolutional layer HCL2 are processed by the second hidden active layer HAL2 to generate a plurality of outputs from the second hidden active layer HAL2.

In one example, generating a respective one of the plurality of outputs from the first hidden convolutional layer HCL1 includes applying a respective one of the first group of convolutional kernels $w_{ij}^1$ to a respective one of the four input IPT to generate an first hidden intermediate output, and adding a respective one of the first group of weights $b_i^1$ to the intermediate output to generate the respective one of the plurality of outputs from the first hidden layer HCL1.

In another example, generating a respective one of the plurality of outputs from the second hidden convolutional layer HCL2 includes applying a respective one of the second group of convolutional kernels $w_{ij}^2$ to a respective one of the plurality of outputs from the first hidden convolutional layer HCL1 to generate a second hidden intermediate output, and adding a respective one of the second group of weights $b_i^2$ to the second hidden intermediate output to generate the respective one of the plurality of outputs from the second hidden convolutional layer HCL2.

For example, outputs from the first hidden active layer HAL1 is the three outputs OPHL of the hidden layer HL. Outputs from the second hidden active layer HAL2 is the two outputs OPT of the output layer OL.

In some embodiments, a convolutional layer is a core layer of a convolutional neural network. In a convolutional layer, a neuron is connected with some of neurons in a direct adjacent convolutional layer. Optionally, a convolutional layer applies a plurality of convolutional kernels to an input image to extract a plurality of features from the input image. A convolutional layer can extract a type of features from the input image. Optionally, an initialized convolutional kernel is a random fractional matrix, During the pre-training process of the convolutional neural network, the convolutional kernel obtains a reasonable value by learning.

Optionally, a result obtained by applying the convolutional kernel to an input image is called a feature map. The number of a plurality of feature maps is equivalent to the number of a plurality of convolutional kernels. A respective one of the plurality of feature maps corresponds to a respective one of the plurality of convolutional kernels.

Optionally, the respective one of the plurality of feature maps is formed by neurons rectangularly arranged. The neurons of the respective one of the plurality of feature maps share the respective one of the plurality of convolutional kernels.

Optionally, a convolutional neural network has a plurality of convolutional layers. A feature map output from a respective one of the plurality of convolutional layers is input into a downstream one of the plurality of convolutional layers. The downstream one of the plurality of convolutional layer processes the feature map output from the respective one of the plurality of convolutional layers and outputs a downstream feature map of the plurality of feature maps.

In some embodiments, a down-sampling layer is between two adjacent convolutional layers. In one example, the pooling layer is used to reduce the size of an input image to simplify the computational complexity and reduce the overfitting phenomenon. In another example, the pooling layer can compress features and extract main features of the input image. Optionally, the pooling layer reduces a size of a respective one of the feature maps, but does not change the number of the feature maps. For example, an input image having a size of 12×12 is sampled by a 6×6 filter, subsequently, the 6×6 filter outputs an output image having a size of 2×2, which means the 144 pixels of the input image having the size of 12×12 is divided into four portions, each portion of the four portions of the 144 pixels has 36 pixels. subsequent to a pooling process using the 6×6 filter, the 36 pixels in each portion is combined into 1 pixel, and the output image generated has a size of 2×2.

As used herein, the term "pooling" refers to a type of down-sampling. Various methods may be used for pooling. Examples of methods suitable for pooling includes, but are not limited to, max-pooling, avg-polling, decimation, and demuxout. As used herein, the term "down-sampling" refers to a process of extracting features of an input image, and outputting an output image with a smaller size. As used herein, the term "up-sampling" refers to a process of adding more information to an input image, and outputting an outputting image with a larger scale.

Figure 2:
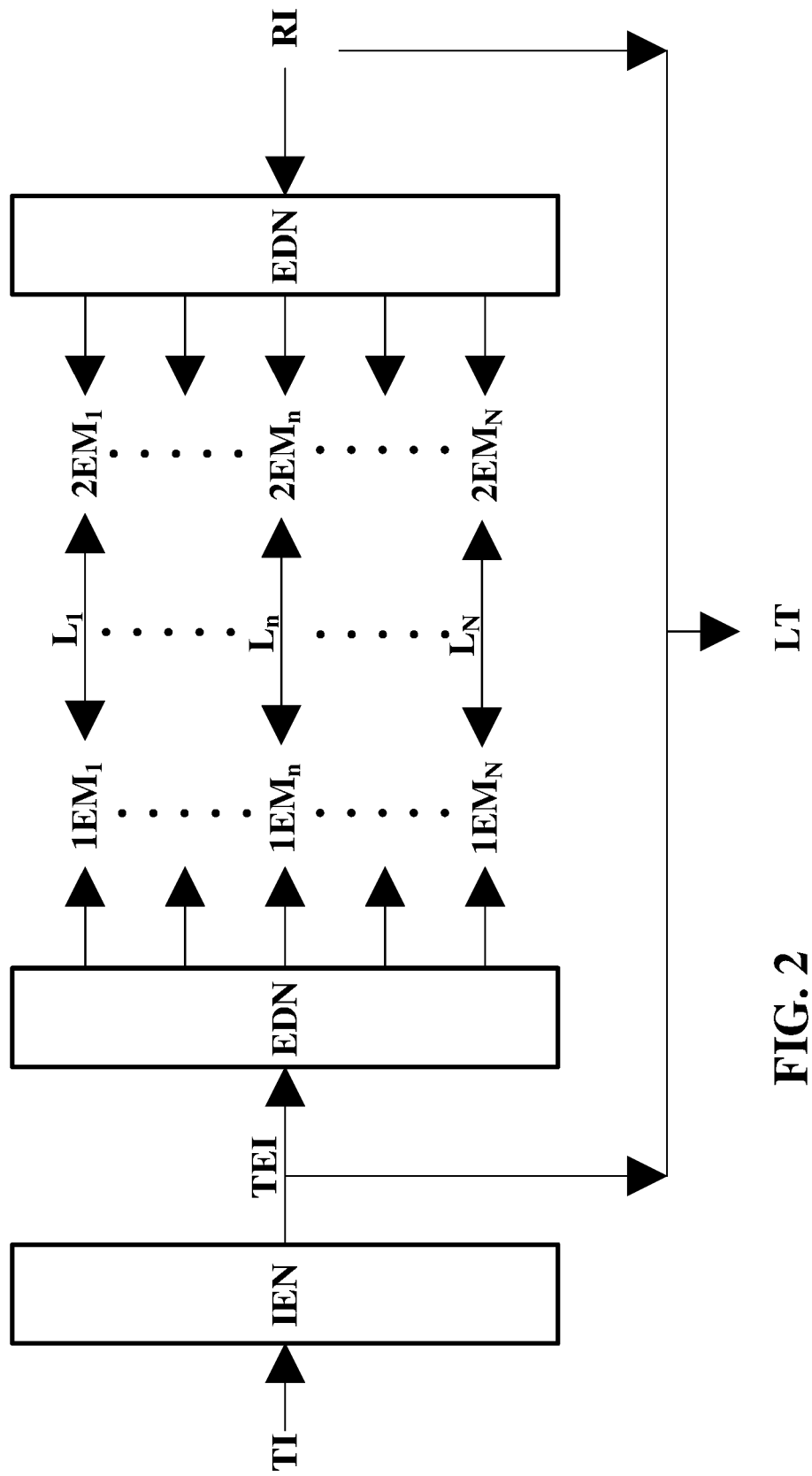
FIG. 2 illustrates a computer-implemented method of training an image-enhancing convolutional neural network in some embodiments according to the present disclosure.

FIG. 2 illustrates a computer-implemented method of training an image-enhancing convolutional neural network in some embodiments according to the present disclosure. Referring to FIG. 2, the method in some embodiments includes obtaining a pair of training samples including a training image TI having a first degree of sharpness and a reference image RI having a second degree of sharpness, at least portions of the training image TI and the reference image RI in a same pair having same contents. Optionally, the second degree is greater than the first degree. In one example, the training image TI and the reference image RI have a same content, but the training image has an image quality lower than an image quality of the reference image. In one example, the training image TI and the reference image RI have a same content, but the training image TI has a resolution lower than a resolution of the reference image RI. In another example, the training image TI and the reference image RI have a same content, but the training image TI has a contrast lower than a contrast of the reference image RI. As used herein, the term "image quality" broadly encompasses various properties that affect visual experience of the image, which can be affected by various factors include, but are not limited to, resolution of the image data, color depth of the image data, contrast of the image data, and whether the image has been compressed with high or low compression quality. The image-enhancing convolutional neural network IEN is configured to enhance an original image.

In some embodiments, the pair of the training image TI and the reference image RI can be selected from a sample database which is prepared for training the image-enhancing convolutional neural network configured to enhance an original image. There are a plurality of pairs of training images and reference images, a respective one of the plurality of pairs of training images and reference images includes a training image TI and a reference image RI. In one example, the training image TI and the reference image RI are obtained by taking the same scene under different exposure conditions. One image having a relatively higher contrast is the reference image RI, and another one image having a relatively lower contrast is the training image TI.

Referring to FIG. 2, the method in some embodiments further includes inputting the training image TI to the image-enhancing convolutional neural network IEN to generate a training enhanced image TEI; inputting the training enhanced image TEI into an edge detector (such as an edge detection neural network EDN depicted in FIG. 2); and inputting the reference image RI into the edge detection neural network EDN. The edge detection neural network EDN, upon receiving the training enhanced image TEI, is configured to generate a plurality of first edge maps (e.g., $1EM_1, \ldots, 1EM_n, \ldots, 1EM_N$ as shown in FIG. 2), based on the training enhanced image TEI. The edge detection neural network EDN, upon receiving the reference image RI, is configured to generate a plurality of second edge maps (e.g., $2EM_1, \ldots, 2EM_n, \ldots, 2EM_N$ as shown in FIG. 2), based on the reference image RI. Optionally, the rality of second edge maps (e.g., $2EM_1, 2EM_n, 2EM_N$ as shown in FIG. 2) are of a same scale. The method in some embodiments further includes calculating one or more losses (e.g., $L_1, \ldots, L_n, \ldots, L_N$ as shown in FIG. 2) based on the plurality of first edge maps and the plurality of second edge maps. A respective one of the one or more losses is calculated based on a respective one of the plurality of first edge maps and a respective one of the plurality of second edge maps, wherein the respective one of the plurality of first edge maps and the respective one of the plurality of second edge maps have a same scale. Various appropriate edge detectors may be used for detecting edges in the present disclosure.

The method in some embodiments further includes timing parameters in the image-enhancing convolutional neural network IEN at least partially based on the one or more losses. Various tuning methods may be used for tuning parameters in the image-enhancing convolutional neural network IEN. In one example, parameters of the image-enhancing convolutional neural network IEN may be tuned to minimize at least the one or more losses.

In some embodiments, the method further includes reiterating training the image-enhancing convolutional neural network IEN using the pair of the training image TI and the reference image RI or a different pair of a training image and a reference image. Optionally, reiterating training the image-enhancing convolutional neural network IEN includes reiterating training the training the image-enhancing convolutional neural network IEN using the pair of the training image TI and the reference image RI. Optionally, reiterating training the image-enhancing convolutional neural network IEN includes reiterating training the training the image-enhancing convolutional neural network IEN using a different pair of a training image and a reference image. Optionally, in the process of reiterating training the image-enhancing convolutional neural network IEN, the training image TI of the pair of the training image TI and the reference image RI are kept, but the reference image RI of the pair of the training image TI and the reference image RI is replaced with a difference reference image which also has a same content as the training image. Optionally, in the process of reiterating training the image-enhancing convolutional neural network IEN, the reference image RI of the pair of the training image TI and the reference image RI are kept, but the training image TI of the pair of the training image TI and the reference image RI is replaced with a difference training image which also has a same content as the reference image RI.

Optionally, in order to avoid selecting the same pair of the training image and the reference image during reiterating, the pair of the training image and the reference image used in the training process can be deleted from the sample database.

Figure 3:
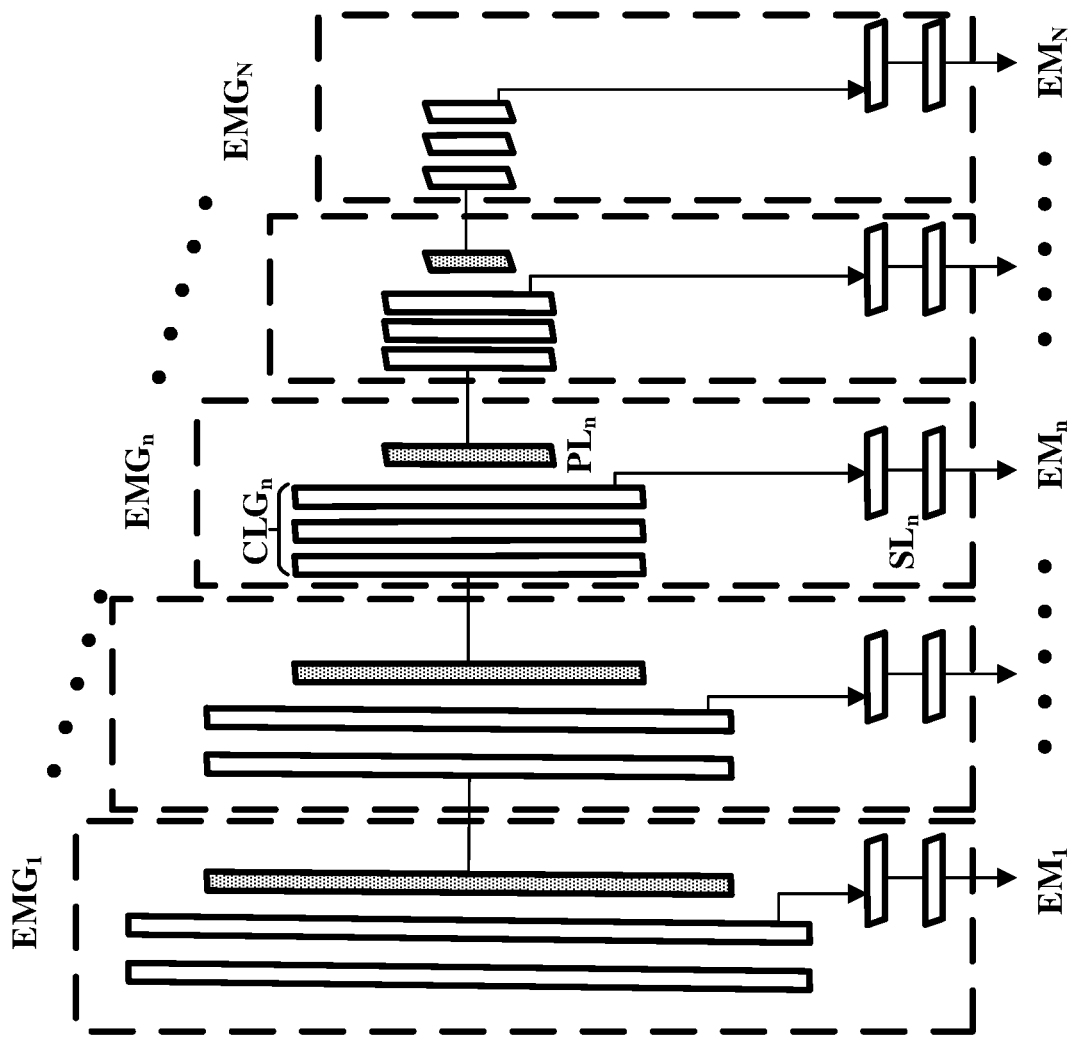
FIG. 3 illustrates the structure of an edge detection neural network in some embodiments according to the present disclosure.

FIG. 3 illustrates the structure of an edge detection neural network in some embodiments according to the present disclosure. Referring to FIG. 3, the edge detection neural network EDN in some embodiments includes N number of edge map generators (e.g., $EMG_1, \ldots, EMG_n, \ldots, EMG_N$ as shown in FIG. 3) respectively configured to generate N number of edge maps (e.g., $EM_1, \ldots, EM_n, \ldots, EM_N$ as shown in FIG. 3). Depending on the input, the N number of edge maps can be edge maps corresponding to the training enhanced image or the reference image. In one example, the input to the edge detection neural network is the training enhanced image, and the N number of edge maps are the plurality of first edge maps (e.g., $1EM_1, \ldots, 1EM_n, \ldots, 1EM_N$ as shown in FIG. 2). In another example, the input to the edge detection neural network is the reference image, and the N number of edge maps are the plurality of second edge maps (e.g., $2EM_1, 2EM_n, 2EM_N$ as shown in FIG. 2).

In some embodiments, a n-th edge map generator $EMG_n$ of the N number of edge map generators includes a n-th group of convolutional layers $CLG_n$, and a n-th side layer $SL_n$ connected to a last convolutional layer and configured to output a n-th edge map $EM_n$ of a same scale, $1 \leq n \leq N$. Optionally, when $1 \leq n \leq N$, the n-th edge map generator $EMG_n$ of the N number of edge map generators further includes a n-th down sampling layer $PL_n$ (e.g., a n-th pooling layer) connected to the last convolutional layer of the n-th group of convolutional layers CLG.

Figure 4:
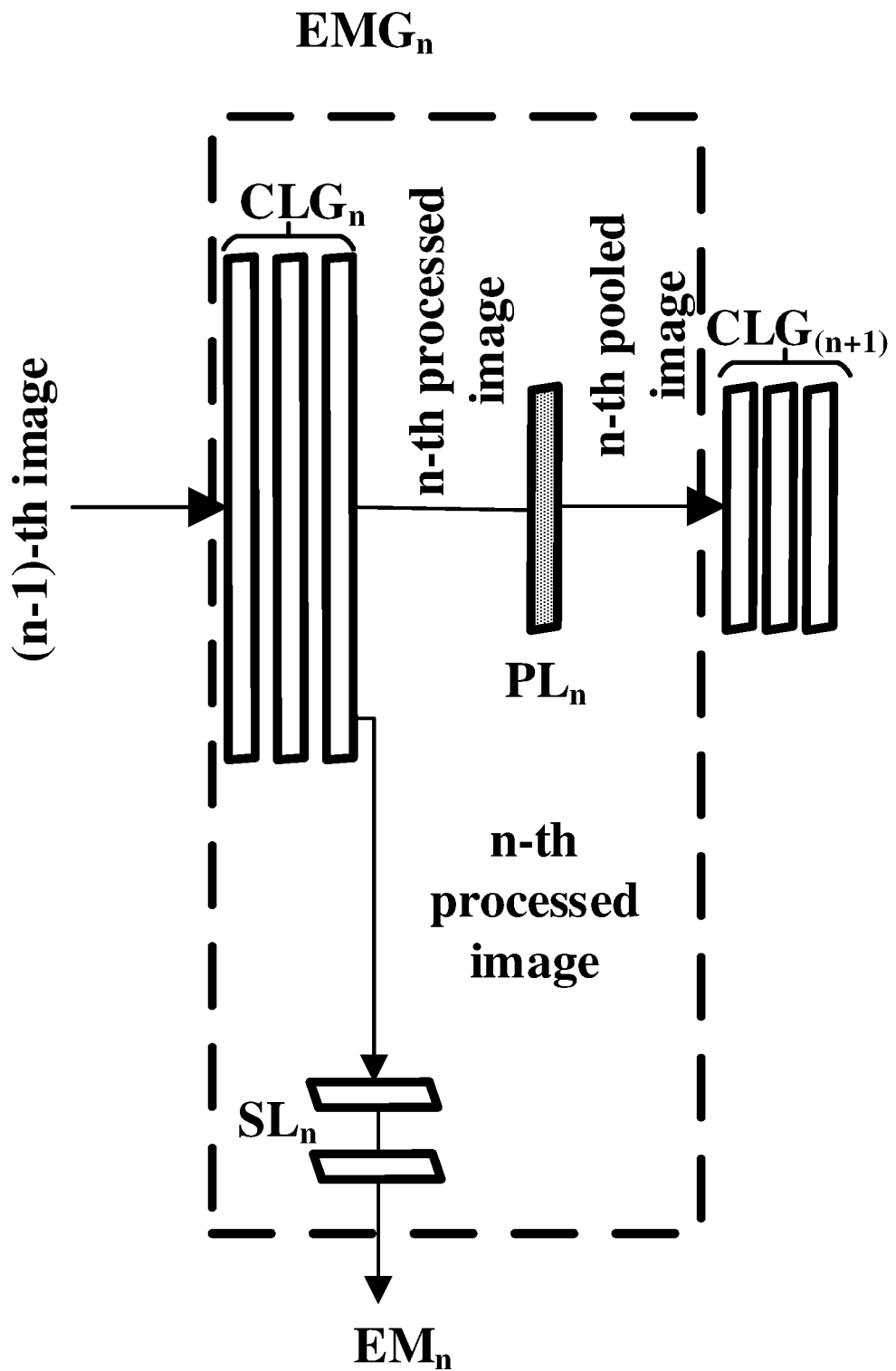
FIG. 4 illustrates a computer-implemented method of training an image-enhancing convolutional neural network in some embodiments according to the present disclosure.

FIG. 4 illustrates a computer-implemented method of training an image-enhancing convolutional neural network in some embodiments according to the present disclosure. Referring to FIG. 4, the method in some embodiments includes inputting a (n−1)-th image into the n-th group of convolutional layers $CLG_n$; processing the (n−1)-th image by the n-th group of convolutional layers $CLG_n$ to generate a n-th processed image; down-sampling (e.g., pooling) the n-th processed image by the n-th down-sampling layer $PL_n$ to generate a n-th down-sampled image; processing the n-th processed image by the n-th side layer $SL_n$ to generate the n-th edge map of the same scale; and when n<N, inputting the n-th down-sampled image into a (n+1)-th group of convolutional layers $CLG_{(n+1)}$.

Figure 5:
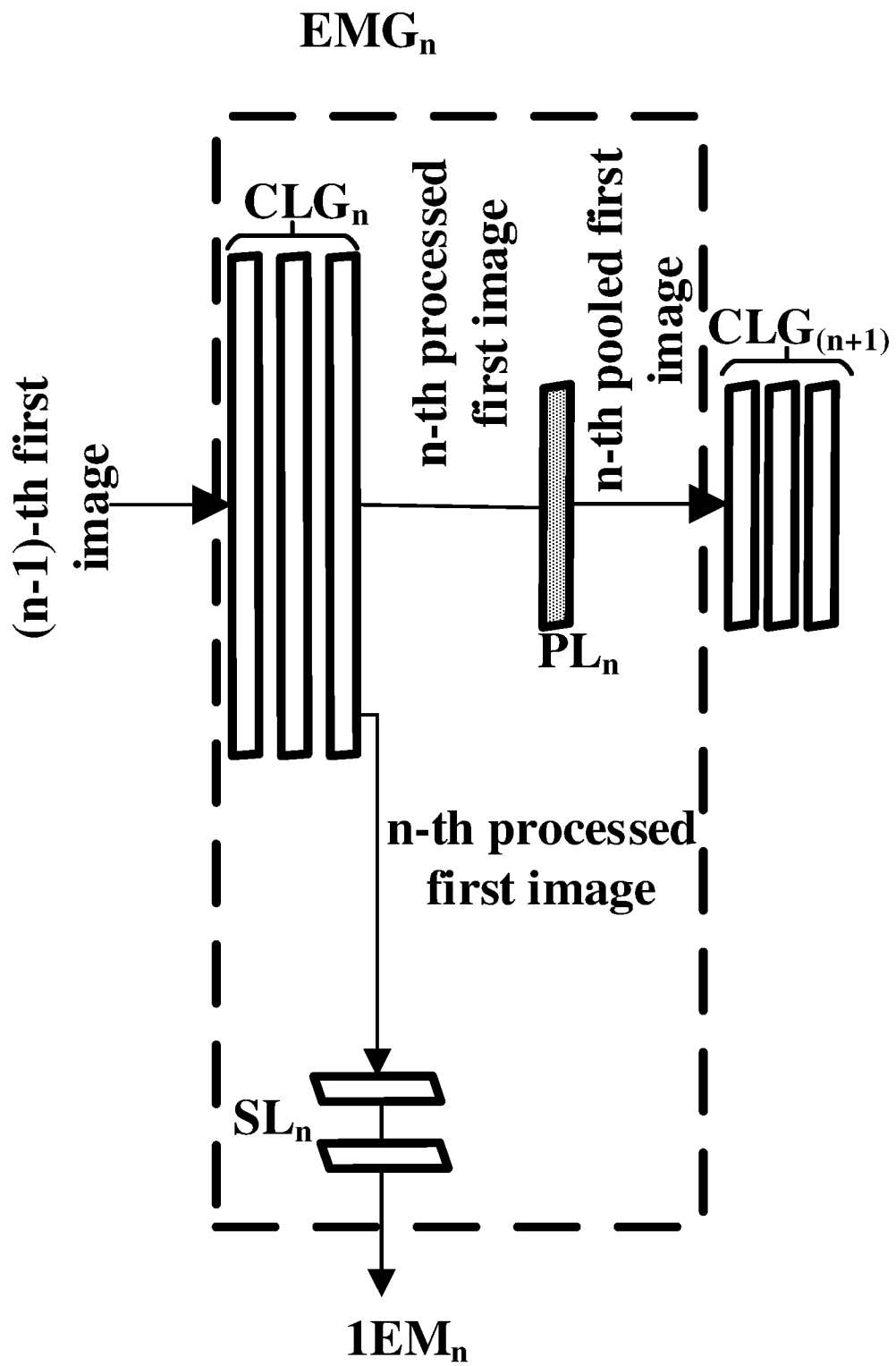
FIG. 5 illustrates a computer-implemented method of training an image-enhancing convolutional neural network in some embodiments according to the present disclosure.

In some embodiments, the (n−1)-th image is a (n−1)-th first image; the method includes generating a n-th first edge map of a same scale by the n-th edge map generator $EMG_n$. FIG. 5 illustrates a computer-implemented method of training an image-enhancing convolutional neural network in some embodiments according to the present disclosure. Referring to FIG. 5, in some embodiments, generating the n-th first edge map includes inputting a (n−1)-th first image into the n-th group of convolutional layers $CLG_n$; processing the (n−1)-th first image by the n-th group of convolutional layers $CLG_n$ to generate a n-th processed first image; down-sampling (e.g., pooling) the n-th processed first image by the n-th down-sampling layer $PL_n$ to generate a n-th down-sampled first image; processing the n-th processed first image by the n-th side layer $SL_n$ to generate the n-th first edge map $1EM_n$ of the same scale; and when n<N, inputting the n-th down-sampled first image into a (n+1)-th group of convolutional layers $CLG_{(n+1)}$. In one example, the (n−1)-th first image is the training enhanced image when n=1. In another example, the (n−1)-th first image is a (n−1)-th down-sampled first image when n>1.

Figure 6:
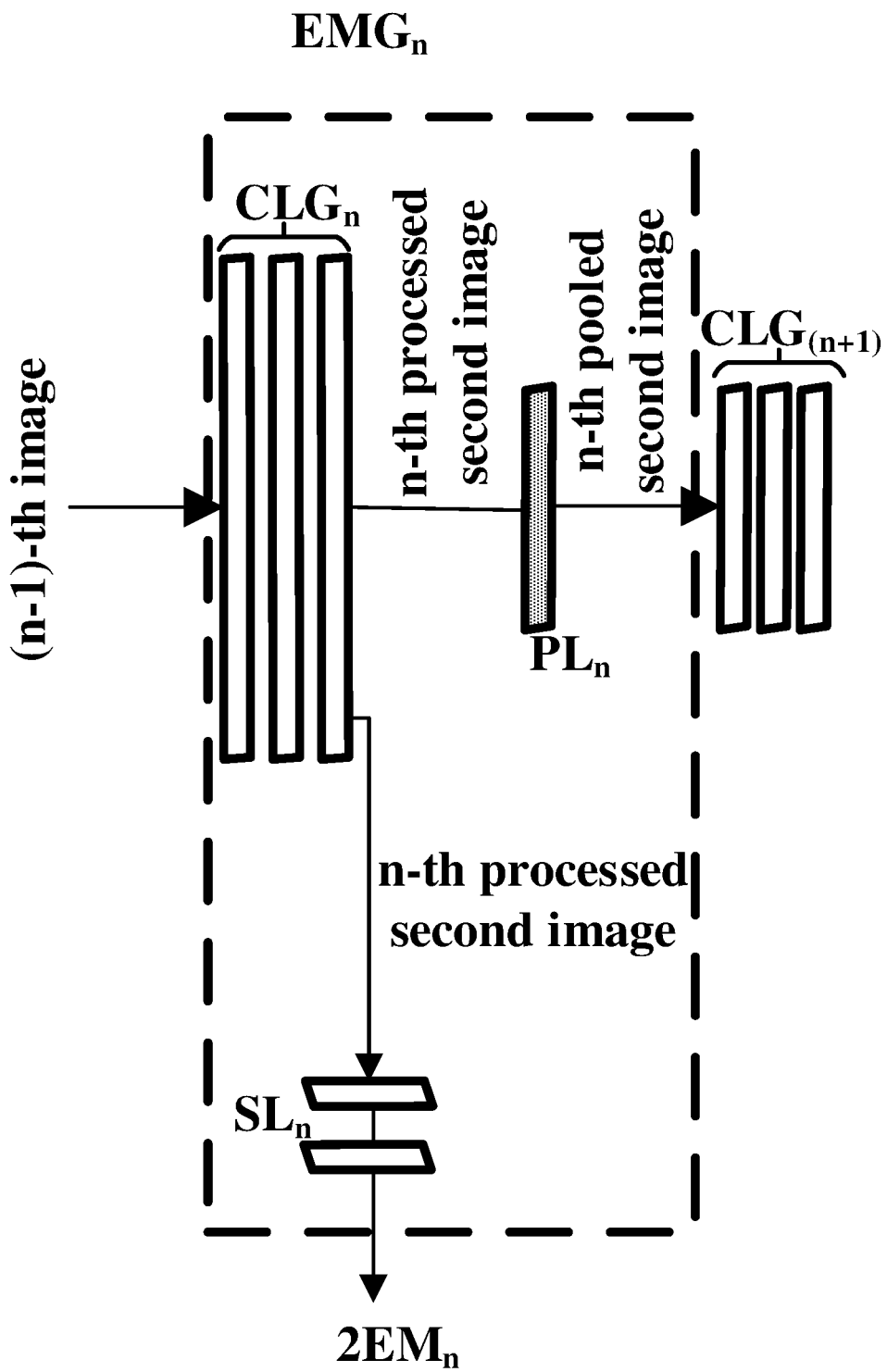
FIG. 6 illustrates a computer-implemented method of training an image-enhancing convolutional neural network in some embodiments according to the present disclosure.

In some embodiments, the (n−1)-th image is a (n−1)-th second image; the method includes generating a n-th second edge map of a same scale by the n-th edge map generator $EMG_n$. FIG. 6 illustrates a computer-implemented method of training an image-enhancing convolutional neural network in some embodiments according to the present disclosure. Referring to FIG. 6, in some embodiments, generating the n-th second edge map includes inputting a (n−1)-th second image into the n-th group of convolutional layers $CLG_n$, processing the (n−1)-th second image by the n-th group of convolutional layers $CLG_n$ to generate a n-th processed second image; down-sampling (e.g., pooling) the n-th processed second image by the n-th down-sampling layer $PL_n$ to generate a n-th down-sampled second image; processing the n-th processed second image by the n-th side layer $SL_n$ to generate the n-th second edge map $2EM_n$ of the same scale; and when n<N, inputting the n-th down-sampled second image into a (n+1)-th group of convolutional layers $CLG_{(n+1)}$. In one example, the (n−1)-th second image is the reference image when n=1. In another example, the (n−1)-th second image is a (n−1)-th down-sampled second image when n>1.

In some embodiments, the n-th group of convolutional layers $CLG_n$ includes multiple convolutional layers and multiple active layers. Optionally, each of the multiple convolutional layers includes (p×64) number of 3×3 convolutional kernels, wherein p is a positive integer. In some embodiments, the n-th side layer $SL_n$ includes a convolutional layer and a deconvolutional layer sequentially connected, the convolutional layer connected to the last convolutional layer of the n-th group of convolutional layers. The convolutional layer of the n-th side layer $SL_n$ converts a multiple-channel feature image into a single-channel feature image. The deconvolutional layer of the n-th side layer $SL_n$ is an up-sampling layer. Input images respectively into the N number of side layers have respectively different scales. Deconvolutional layers respectively in the N number of side layers have respectively up-sample the input images by different multiples (for example, by 1, 2, 4, 8, 16, etc.). In one example, N number of edge maps respectively from the N number of side layers are of a same scale.

In one example, the edge detection neural network includes a first group of convolutional layers, a first pooling layer, a first side layer, a second group of convolutional layers, a second pooling layer, a second side layer, a third group of convolutional layers, a third pooling layer, a third side layer, a fourth group of convolutional layers, a fourth pooling layer, a fourth side layer, a fifth group of convolutional layers, and a fifth side layer. Optionally, the first group of convolutional layers includes two convolutional layers and two active layers, each of the two convolutional layers comprises 64 number of 3×3 convolutional kernels. Optionally, the second group of convolutional layers comprises two convolutional layers and two active layers, each of the two convolutional layers comprises 128 number of 3×3 convolutional kernels. Optionally, the third group of convolutional layers comprises three convolutional layers and three active layers, each of the three convolutional layers comprises 256 number of 3×3 convolutional kernels. Optionally, the fourth group of convolutional layers comprises three convolutional layers and three active layers, each of the three convolutional layers comprises 512 number of 3×3 convolutional kernels. Optionally, the fifth group of convolutional layers comprises three convolutional layers and three active layers, each of the three convolutional layers comprises 512 number of 3×3 convolutional kernels.

In some embodiments, calculating one or more losses based on the plurality of first edge maps and the plurality of second edge maps includes calculating a n-th loss $L_n$ based on a n-th first edge map $1EM_n$ of the same scale and a n-th second edge map $2EM_n$ of the same scale, 1≤n≤N. Optionally, the one or more first losses comprises $\Sigma_1^N Loss_n$; wherein $Loss_n$ stands for the n-th loss. Various appropriate losses may be used for training the image-enhancing convolutional neural network. In some embodiments, calculating the n-th loss $L_n$ includes calculating one or more of a L2 loss, a L1 loss, and a MSE loss. In some embodiments, calculating the n-th loss $L_n$ includes calculating a L2 loss using a L2 loss function expressed as sum $(|Y-f(x)|^2)$; wherein Y stands for a value of a pixel in the n-th second edge map, f(x) stands for a value of a pixel in the n-th first edge map, and sum stands for a summation operation. In some embodiments, calculating the n-th loss $L_n$ includes calculating a L1 loss using a L1 loss function expressed as sum $(|Y-f(x)|)$; wherein Y stands for a value of a pixel in the n-th second edge map, f(x) stands for a value of a pixel in the n-th first edge map, and sum stands for a summation operation. In some embodiments, calculating the n-th loss $L_n$ includes calculating a MSE loss using a MSE loss function expressed as avg $(|Y-f(x)|^2)$; wherein Y stands for a value of a pixel in the n-th second edge map, f(x) stands for a value of a pixel in the n-th first edge map, and avg stands for an averaging operation.

In the present method, the one or more losses based on the plurality of first edge maps and the plurality of second edge maps are calculated. By minimizing the one or more losses, edges of the training enhanced image TEI can be generated to be more consistent with edges of the reference image RI. Using the present method, more edge detailed can be preserved in an enhanced image generated by the image-enhancing convolutional neural network IEN.

Referring to FIG. 2, in some embodiments, the method further includes comparing the training enhanced image TEI with the reference image RI to calculate an overall loss LT (a second loss). Tuning the parameters in the image-enhancing convolutional neural network IEN includes tuning parameters in the image-enhancing convolutional neural network IEN to minimize the overall loss LT. Optionally, tuning the parameters in the image-enhancing convolutional neural network IEN includes tuning parameters in the image-enhancing convolutional neural network IEN to minimize at least the one or more first losses and the overall loss LT. In some embodiments, calculating the overall loss LT includes calculating one or more of a L2 loss, a L1 loss, and a MSE loss. In some embodiments, calculating the overall loss LT includes calculating a L2 loss using a L2 loss function expressed as sum $(|Y-f(x)|^2)$; wherein Y stands for a value of a pixel in the n-th second edge map, f(x) stands for a value of a pixel in the n-th first edge map, and sum stands for a summation operation. In some embodiments, calculating the overall loss LT includes calculating a L1 loss using a L1 loss function expressed as sum $(|Y-f(x)|)$; wherein Y stands for a value of a pixel in the n-th second edge map, f(x) stands for a value of a pixel in the n-th first edge map, and sum stands for a summation operation. In some embodiments, calculating the overall loss LT includes calculating a MSE loss using a MSE loss function expressed as avg $(|Y-f(x)|^2)$; wherein Y stands for a value of a pixel in the n-th second edge map, f(x) stands for a value of a pixel in the n-th first edge map, and avg stands for an averaging operation.

In the present method, the overall loss based on comparison between the training enhanced image TEI with the reference image RI is calculated. By minimizing the overall loss, it can be ensured that contents of the original image can be preserved in an enhanced image generated by the image-enhancing convolutional neural network IEN.

In some embodiments, the method further includes comparing the training enhanced image TEI with the reference image RI to calculate a third loss. Tuning the parameters in the image-enhancing convolutional neural network IEN includes tuning parameters in the image-enhancing convolutional neural network IEN to minimize the third loss. Optionally, tuning the parameters in the image-enhancing convolutional neural network IEN includes tuning parameters in the image-enhancing convolutional neural network IEN to minimize at least the one or more first losses and the third loss. Optionally, tuning the parameters in the image-enhancing convolutional neural network TEN includes tuning parameters in the image-enhancing convolutional neural network TEN to minimize at least the one or more first losses, the overall loss LT, and the third loss.

Figure 10:
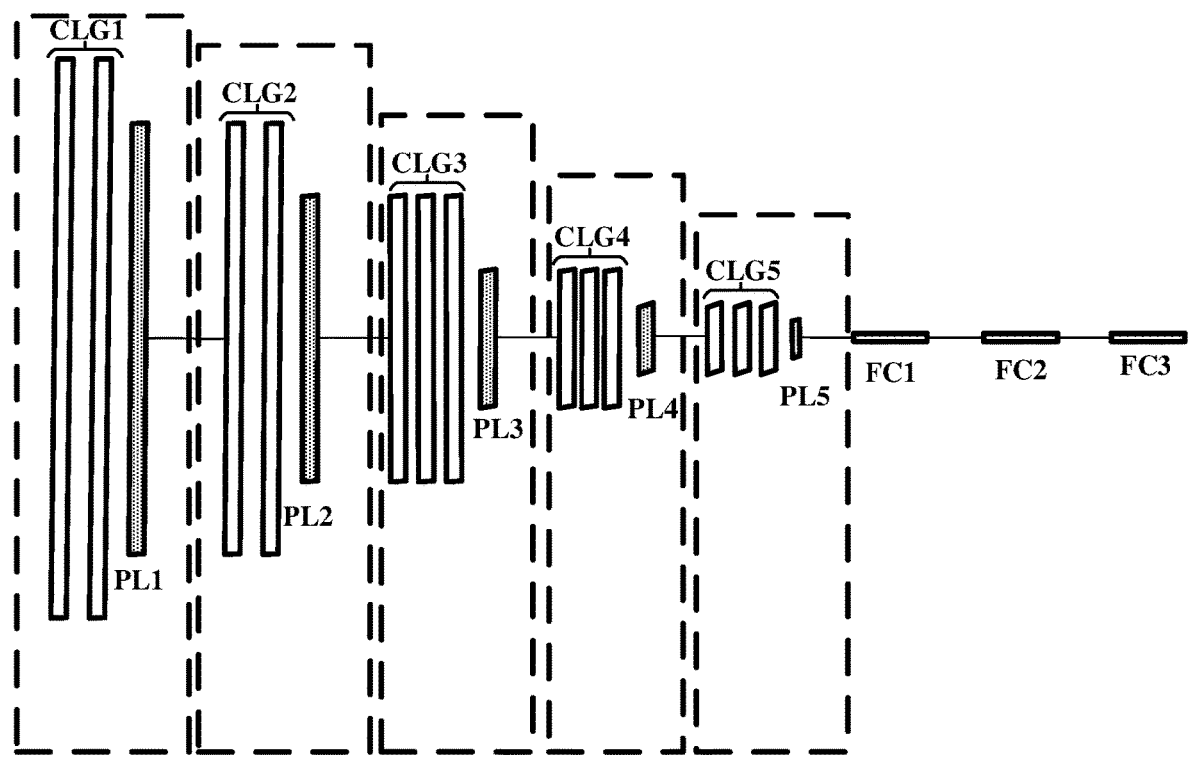
FIG. 10 illustrates the structure of a VGG16 neural network in some embodiments according to the present disclosure.

In some embodiments, the method includes respectively inputting the training enhanced image TEI and the reference image RI into a VGG neural network to respectively generating outputs from the VGG neural network; and calculating the third loss based on the outputs from the VGG neural network. Optionally, the VGG neural network is a VGG16 neural network. FIG. 10 illustrates the structure of a VGG16 neural network in some embodiments according to the present disclosure. Referring to FIG. 10, the VGG16 neural network in some embodiments includes a first group CLG1 of convolutional layers, a first pooling layer PL1, a second group CLG2 of convolutional layers, a second pooling layer PL2, a third group CLG3 of convolutional layers, a third pooling layer PL3, a fourth group CLG4 of convolutional layers, a fourth pooling layer PL4, a fifth group CLG5 of convolutional layers, a fifth pooling layer PL5, a first full connection layer FC1, second full connection layer FC2, and a third full connection layer FC3. Optionally, the first group of convolutional layers includes two convolutional layers and two active layers, each of the two convolutional layers comprises 64 number of 3×3 convolutional kernels. Optionally, the second group of convolutional layers comprises two convolutional layers and two active layers, each of the two convolutional layers comprises 128 number of 3×3 convolutional kernels. Optionally, the third group of convolutional layers comprises three convolutional layers and three active layers, each of the three convolutional layers comprises 256 number of 3×3 convolutional kernels. Optionally, the fourth group of convolutional layers comprises three convolutional layers and three active layers, each of the three convolutional layers comprises 512 number of 3×3 convolutional kernels. Optionally, the fifth group of convolutional layers comprises three convolutional layers and three active layers, each of the three convolutional layers comprises 512 number of 3×3 convolutional kernels.

In some embodiments, the method includes inputting the training enhanced image TEI into a VGG16 neural network; generating a first output by a m-th convolutional layer in a n-th group of convolutional layers in the VGG16 neural network; inputting the reference image RI into the VGG16 neural network; generating a second output by the m-th convolutional layer in the n-th group of convolutional layers in the VGG16 neural network; calculating the third loss based on the first output and the second output; wherein m is a positive integer, and n is a positive integer, $1 \leq n \leq N$, $1 \leq m \leq M$, M is a total number of convolutional layers in the n-th group of convolutional layers.

In some embodiments, m=1, and n=3. The method includes inputting the training enhanced image TEI into the VGG16 neural network; generating a first output by a first convolutional layer in a third group CLG3 of convolutional layers in the VGG16 neural network; inputting the reference image RI into the VGG16 neural network; generating a second output by the first convolutional layer in the third group CLG3 of convolutional layers in the VGG16 neural network; calculating the third loss based on the first output and the second output. Optionally, the third group of convolutional layers comprises three convolutional layers and three active layers, each of the three convolutional layers comprises 256 number of 3×3 convolutional kernels.

In some embodiments, calculating the third loss includes calculating one or more of a L2 loss, a L1 loss, and a MSE loss. In some embodiments, calculating the third loss includes calculating a L2 loss using a L2 loss function expressed as sum $(|Y-f(x)|^2)$; wherein Y stands for a value of a pixel in the second output, f(x) stands for a value of a pixel in the first output, and sum stands for a summation operation. In some embodiments, calculating the third loss includes calculating a L1 loss using a L1 loss function expressed as sum $(|Y-f(x)|)$; wherein Y stands for a value of a pixel in the second output, f(x) stands for a value of a pixel in the first output, and sum stands for a summation operation. In some embodiments, calculating the third loss includes calculating a MSE loss using a MSE loss function expressed as avg $(|Y-f(x)|^2)$; wherein Y stands for a value of a pixel in the second output, f(x) stands for a value of a pixel in the first output, and avg stands for an averaging operation.

Figure 11:
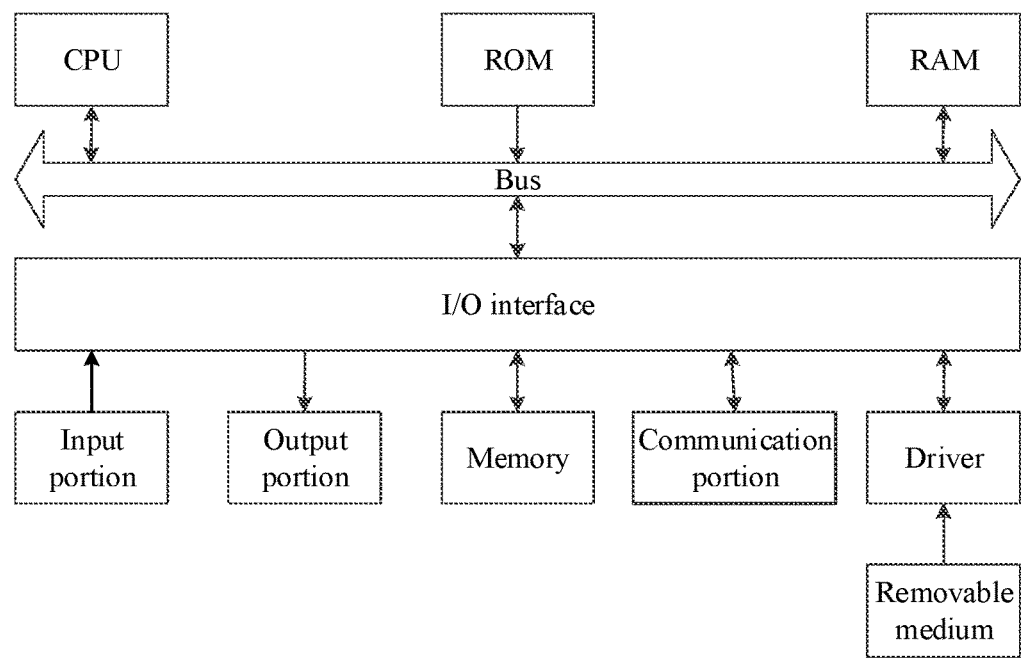
FIG. 11 is a schematic diagram of a structure of an apparatus in some embodiments according to the present disclosure.

In another aspect, the present disclosure provides an apparatus for training an image-enhancing convolutional neural network configured to enhance an original image. FIG. 11 is a schematic diagram of a structure of an apparatus in some embodiments according to the present disclosure. Referring to FIG. 11, in some embodiments, the apparatus includes the central processing unit (CPU) configured to perform actions according to the computer-executable instructions stored in a ROM or in a RAM. Optionally, data and programs required for a computer system are stored in RAM. Optionally, the CPU, the ROM, and the RAM are electrically connected to each other via bus. Optionally, an input/output interface is electrically connected to the bus.

In some embodiments, the apparatus in some embodiments includes a memory; and one or more processors. The memory and the one or more processors are connected with each other. The memory stores computer-executable instructions for controlling the one or more processors to obtain a pair of training samples including a training image having a first degree of sharpness and a reference image having a second degree of sharpness, at least portions of the training image and the reference image in a same pair having same contents; input the training image to the image-enhancing convolutional neural network to generate a training enhanced image; input the training enhanced image into an edge detection neural network; generate, by the edge detection neural network, a plurality of first edge maps, based on the training enhanced image; input the reference image into the edge detection neural network; generate, by the edge detection neural network, a plurality of second edge maps, based on the reference image; calculate one or more losses based on the plurality of first edge maps and the plurality of second edge maps, a respective one of the one or more losses being calculated based on a respective one of the plurality of first edge maps and a respective one of the plurality of second edge maps, the respective one of the plurality of first edge maps and the respective one of the plurality of second edge maps having a same scale; and tune parameters in the image-enhancing convolutional neural network to minimize at least the one or more losses.

In some embodiments, the edge detection neural network includes N number of edge map generators respectively configured to generate N number of edge maps. Optionally, a n-th edge map generator of the N number of edge map generators includes a n-th group of convolutional layers, a n-th side layer connected to a last convolutional layer and configured to output a n-th edge map of a same scale, $1 \leq n \leq N$. Optionally, when $1 \leq n \leq N$, the n-th edge map generator of the N number of edge map generators further includes a n-th down sampling layer (e.g., a n-th pooling layer) connected to the last convolutional layer of the n-th group of convolutional layers. Optionally, the memory stores computer-executable instructions for controlling the one or more processors to input a (n−1)-th image into the n-th group of convolutional layers; process the (n−1)-th image by the n-th group of convolutional layers to generate a n-th processed image; pool the n-th processed image by the n-th down-sampling layer to generate a n-th down-sampled image; process the n-th processed image by the n-th side layer to generate the n-th edge map of a same scale; and when n<N, input the n-th down-sampled image into a (n+1)-th group of convolutional layers.

In some embodiments, the memory further stores computer-executable instructions for controlling the one or more processors to generate a n-th first edge map of a same scale by the n-th edge map generator. Optionally, the memory further stores computer-executable instructions for controlling the one or more processors to input a (n−1)-th first image into the n-th group of convolutional layers; process the (n−1)-th first image by the n-th group of convolutional layers to generate a n-th processed first image; pool the n-th processed first image by the n-th down-sampling layer to generate a n-th down-sampled first image; process the n-th processed first image by the n-th side layer to generate the n-th first edge map of the same scale; and when n<N, input the n-th down-sampled first image into a (n+1)-th group of convolutional layers. Optionally, the (n−1)-th first image is the training enhanced image when n=1. Optionally, the (n−1)-th first image is a (n−1)-th down-sampled first image when n>1.

In some embodiments, the memory further stores computer-executable instructions for controlling the one or more processors to generate a n-th second edge map of a same scale by the n-th edge map generator. Optionally, the memory further stores computer-executable instructions for controlling the one or more processors to input a (n−1)-th second image into the n-th group of convolutional layers; process the (n−1)-th second image by the n-th group of convolutional layers to generate a n-th processed second image; pool the n-th processed second image by the n-th down-sampling layer to generate a n-th down-sampled second image; process the n-th processed second image by the n-th side layer to generate the n-th second edge map of the same scale; and when n<N, input the n-th down-sampled second image into a (n+1)-th group of convolutional layers. Optionally, the (n−1)-th second image is the reference image when n=1. Optionally, the (n−1)-th second image is a (n−1)-th down-sampled second image when n>1.

In some embodiments, the n-th group of convolutional layers includes multiple convolutional layers and multiple active layers, each of the multiple convolutional layers comprises (p×64) number of 3×3 convolutional kernels. In one example, the multiple convolutional layers in the n-th group of convolutional layers respectively includes 64, 128, 256, 512, and 512 number of 3×3 convolutional kernels.

Optionally, the n-th side layer comprises a convolutional layer and a deconvolutional layer sequentially connected, the convolutional layer connected to the last convolutional layer of the n-th group of convolutional layers.

In some embodiments, the edge detection neural network includes a first group of convolutional layers, a first pooling layer, a first side layer, a second group of convolutional layers, a second pooling layer, a second side layer, a third group of convolutional layers, a third pooling layer, a third side layer, a fourth group of convolutional layers, a fourth pooling layer, a fourth side layer, a fifth group of convolutional layers, and a fifth side layer. Optionally, the first group of convolutional layers includes two convolutional layers and two active layers, each of the two convolutional layers comprises 64 number of 3×3 convolutional kernels. Optionally, the second group of convolutional layers comprises two convolutional layers and two active layers, each of the two convolutional layers comprises 128 number of 3×3 convolutional kernels. Optionally, the third group of convolutional layers comprises three convolutional layers and three active layers, each of the three convolutional layers comprises 256 number of 3×3 convolutional kernels. Optionally, the fourth group of convolutional layers comprises three convolutional layers and three active layers, each of the three convolutional layers comprises 512 number of 3×3 convolutional kernels. Optionally, the fifth group of convolutional layers comprises three convolutional layers and three active layers, each of the three convolutional layers comprises 512 number of 3×3 convolutional kernels.

In some embodiments, the memory further stores computer-executable instructions for controlling the one or more processors to calculate a n-th loss based on a nth first edge map of the same scale and a n-th second edge map of the same scale. Optionally, the memory further stores computer-executable instructions for controlling the one or more processors to calculate one or more of a L2 loss, a L1 loss, and a MSE loss. Optionally, the memory further stores computer-executable instructions for controlling the one or more processors to calculate a L2 loss using a L2 loss function expressed as sum $(|Y-f(x)|^2)$; wherein Y stands for a value of a pixel in the n-th second edge map, f(x) stands for a value of a pixel in the n-th first edge map, and sum stands for a summation operation. Optionally, the memory further stores computer-executable instructions for controlling the one or more processors to calculate a L1 loss using a L1 loss function expressed as sum $(|Y-f(x)|)$; wherein Y stands for a value of a pixel in the n-th second edge map, f(x) stands for a value of a pixel in the n-th first edge map, and sum stands for a summation operation. Optionally, the memory further stores computer-executable instructions for controlling the one or more processors to calculate a MSE loss using a MSE loss function expressed as avg $(|Y-f(x)|^2)$, wherein Y stands for a value of a pixel in the n-th second edge map, f(x) stands for a value of a pixel in the n-th first edge map, and avg stands for an averaging operation.

In some embodiments, the memory further stores computer-executable instructions for controlling the one or more processors to compare the training enhanced image with the reference image to calculate an overall loss (a second loss). Optionally, the memory further stores computer-executable instructions for controlling the one or more processors to tune parameters in the image-enhancing convolutional neural network to minimize at least the one or more losses and the overall loss. Optionally, the memory further stores computer-executable instructions for controlling the one or more processors to calculate one or more of a L2 loss, a L1 loss, and a MSE loss. Optionally, the memory further stores computer-executable instructions for controlling the one or more processors to calculate a L2 loss using a L2 loss function expressed as sum $(|Y-f(x)|^2)$; wherein Y stands for a value of a pixel in the n-th second edge map, f(x) stands for a value of a pixel in the n-th first edge map, and sum stands for a summation operation. Optionally, the memory further stores computer-executable instructions for controlling the one or more processors to calculate a L1 loss using a L1 loss function expressed as sum $(|Y-f(x)|)$; wherein Y stands for a value of a pixel in the n-th second edge map, f(x) stands for a value of a pixel in the n-th first edge map, and sum stands for a summation operation. Optionally, the memory further stores computer-executable instructions for controlling the one or more processors to calculate a MSE loss using a MSE loss function expressed as avg $(|Y-f(x)|^2)$; wherein Y stands for a value of a pixel in the n-th second edge map, f(x) stands for a value of a pixel in the n-th first edge map, and avg stands for an averaging operation.

In some embodiments, the memory further stores computer-executable instructions for controlling the one or more processors to reiterate training the image-enhancing convolutional neural network using the pair of the training image and the reference image or a different pair of a training image and a reference image.

In another aspect, the present disclosure provides a computer-program product for training an image-enhancing convolutional neural network configured to enhance an original image. The computer-program product includes a non-transitory tangible computer-readable medium having computer-readable instructions thereon. The computer-readable instructions being executable by a processor to cause the processor to perform obtaining a pair of training samples including a training image having a first degree of sharpness and a reference image having a second degree of sharpness, at least portions of the training image and the reference image in a same pair having same contents; inputting the training image to the image-enhancing convolutional neural network to generate a training enhanced image; inputting the training enhanced image into an edge detection neural network; generating, by the edge detection neural network, a plurality of first edge maps, based on the training enhanced image; inputting the reference image into the edge detection neural network; generating, by the edge detection neural network, a plurality of second edge maps, based on the reference image; calculating one or more losses based on the plurality of first edge maps and the plurality of second edge maps, a respective one of the one or more losses being calculated based on a respective one of the plurality of first edge maps and a respective one of the plurality of second edge maps, the respective one of the plurality of first edge maps and the respective one of the plurality of second edge maps having a same scale; and tuning parameters in the image-enhancing convolutional neural network to minimize at least the one or more losses.

In some embodiments, the edge detection neural network includes N number of edge map generators respectively configured to generate N number of edge maps. Optionally, a n-th edge map generator of the N number of edge map generators includes a n-th group of convolutional layers, a n-th side layer connected to a last convolutional layer and configured to output a n-th edge map of a same scale, 1≤n≤N. Optionally, when 1≤n≤N, the n-th edge map generator of the N number of edge map generators further includes a n-th down sampling layer (e.g., a n-th pooling layer) connected to the last convolutional layer of the n-th group of convolutional layers. Optionally, the memory stores computer-executable instructions for controlling the one or more processors to input a (n−1)-th image into the n-th group of convolutional layers; process the (n−1)-th image by the n-th group of convolutional layers to generate a n-th processed image; pool the n-th processed image by the n-th down-sampling layer to generate a n-th down-sampled image; process the n-th processed image by the n-th side layer to generate the n-th edge map of the same scale; and when n<N, input the n-th down-sampled image into a (n+1)-th group of convolutional layers.

In some embodiments, the computer-readable instructions are executable by a processor to further cause the processor to perform generating a n-th first edge map of a same scale by the n-th edge map generator. Optionally, the memory further stores computer-executable instructions for controlling the one or more processors to input a (n−1)-th first image into the n-th group of convolutional layers; process the (n−1)-th first image by the n-th group of convolutional layers to generate a n-th processed first image; pool the n-th processed first image by the n-th down-sampling layer to generate a n-th down-sampled first image; process the n-th processed first image by the n-th side layer to generate the n-th first edge map of the same scale; and when n<N, input the n-th down-sampled first image into a (n+1)-th group of convolutional layers. Optionally, the (n−1)-th first image is the training enhanced image when n=1. Optionally, the (n−1)-th first image is a (n−1)-th down-sampled first image when n>1.

In some embodiments, the computer-readable instructions are executable by a processor to further cause the processor to perform generating a n-th second edge map of a same scale by the n-th edge map generator. Optionally, the memory further stores computer-executable instructions for controlling the one or more processors to input a (n−1)-th second image into the n-th group of convolutional layers; process the (n−1)-th second image by the n-th group of convolutional layers to generate a n-th processed second image; pool the n-th processed second image by the n-th down-sampling layer to generate a n-th down-sampled second image, process the n-th processed second image by the n-th side layer to generate the n-th second edge map of the same scale; and when n<N, input the n-th down-sampled second image into a (n+1)-th group of convolutional layers. Optionally, the (n−1)-th second image is the reference image when n=1. Optionally, the (n−1)-th second image is a (n−1)-th down-sampled second image when n>1.

In some embodiments, the n-th group of convolutional layers includes multiple convolutional layers and multiple active layers, each of the multiple convolutional layers comprises (p×64) number of 3×3 convolutional kernels. Optionally, the n-th side layer comprises a convolutional layer and a deconvolutional layer sequentially connected, the convolutional layer connected to the last convolutional layer of the n-th group of convolutional layers.

In some embodiments, the edge detection neural network includes a first group of convolutional layers, a first pooling layer, a first side layer, a second group of convolutional layers, a second pooling layer, a second side layer, a third group of convolutional layers, a third pooling layer, a third side layer, a fourth group of convolutional layers, a fourth pooling layer, a fourth side layer; a fifth group of convolutional layers, and a fifth side layer. Optionally, the first group of convolutional layers includes two convolutional layers and two active layers, each of the two convolutional layers comprises 64 number of 3×3 convolutional kernels. Optionally, the second group of convolutional layers comprises two convolutional layers and two active layers, each of the two convolutional layers comprises 128 number of 3×3 convolutional kernels. Optionally, the third group of convolutional layers comprises three convolutional layers and three active layers, each of the three convolutional layers comprises 256 number of 3×3 convolutional kernels. Optionally, the fourth group of convolutional layers comprises three convolutional layers and three active layers, each of the three convolutional lavers comprises 512 number of 3×3 convolutional kernels. Optionally, the fifth group of convolutional layers comprises three convolutional layers and three active layers, each of the three convolutional layers comprises 512 number of 3×3 convolutional kernels.

In some embodiments, the computer-readable instructions are executable by a processor to further cause the processor to perform calculating a n-th loss based on a n-th first edge map of the same scale and a n-th second edge map of the same scale, $1 \leq n \leq N$. Optionally, the one or more first losses comprises $\Sigma_1^N Loss_n$; wherein $Loss_n$ stands for the n-th loss. Optionally, the computer-readable instructions are executable by a processor to further cause the processor to perform calculating one or more of a L2 loss, a L1 loss, and a MSE loss. Optionally, the computer-readable instructions are executable by a processor to further cause the processor to perform calculating a L2 loss using a L2 loss function expressed as sum $(|Y-f(x)|^2)$; wherein Y stands for a value of a pixel in the n-th second edge map, f(x) stands for a value of a pixel in the n-th first edge map, and sun stands for a summation operation. Optionally, the computer-readable instructions are executable by a processor to further cause the processor to perform calculating a L1 loss using a L1 loss function expressed as sum $(|Y-f(x)|)$; wherein Y stands for a value of a pixel in the n-th second edge map, f(x) stands for a value of a pixel in the n-th first edge map, and sum stands for a summation operation. Optionally, the computer-readable instructions are executable by a processor to further cause the processor to perform calculating a MSE loss using a MSE loss function expressed as avg $(|Y-f(x)|^2)$; wherein Y stands for a value of a pixel in the n-th second edge map, f(x) stands for a value of a pixel in the n-th first edge map, and avg stands for an averaging operation.

In some embodiments, the computer-readable instructions are executable by a processor to further cause the processor to perform comparing the training enhanced image with the reference image to calculate an overall loss (a second loss). Optionally, the computer-readable instructions are executable by a processor to further cause the processor to perform tuning parameters in the image-enhancing convolutional neural network to minimize at least the one or more losses and the overall loss. Optionally, the computer-readable instructions are executable by a processor to further cause the processor to perform calculating one or more of a L2 loss, a L1 loss, and a MSE loss. Optionally, the computer-readable instructions are executable by a processor to further cause the processor to perform calculating a L2 loss using a L2 loss function expressed as sum $(|Y-f(x)|^2)$; wherein Y stands for a value of a pixel in the n-th second edge map, f(x) stands for a value of a pixel in the n-th first edge map, and sum stands for a summation operation. Optionally, the computer-readable instructions are executable by a processor to further cause the processor to perform calculating a L1 loss using a L1 loss function expressed as sum $(|Y-f(x)|)$; wherein Y stands for a value of a pixel in the n-th second edge map, f(x) stands for a value of a pixel in the n-th first edge map, and sum stands for a summation operation. Optionally, the computer-readable instructions are executable by a processor to further cause the processor to perform calculating a MSE loss using a MSE loss function expressed as avg $(|Y-f(x)|^2)$; wherein Y stands for a value of a pixel in the n-th second edge map, f(x) stands for a value of a pixel in the n-th first edge map, and avg stands for an averaging operation.

In some embodiments, the computer-readable instructions are executable by a processor to further cause the processor to perform reiterating training the image-enhancing convolutional neural network using the pair of the training image and the reference image or a different pair of a training image and a reference image.

Figure 7:
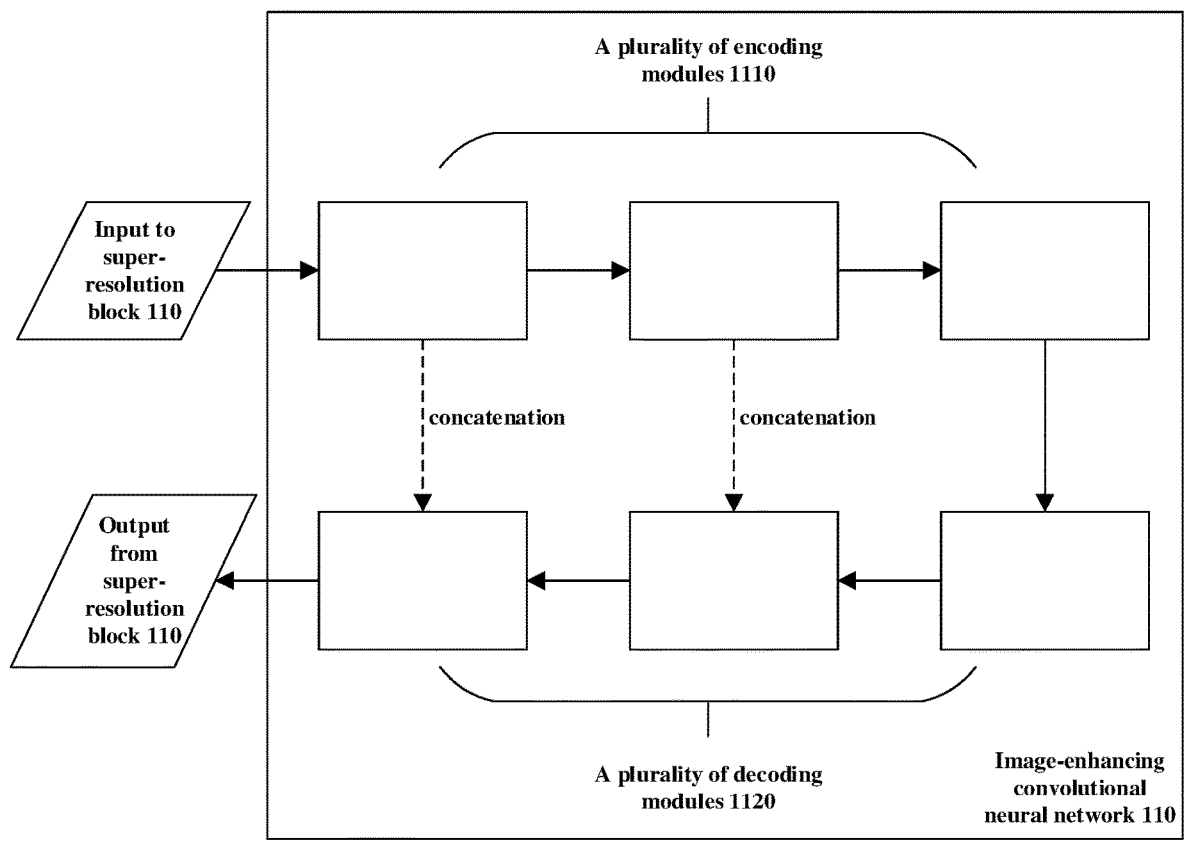
FIG. 7 is a schematic diagram illustrating the structure of an image-enhancing convolutional neural network in some embodiments according to the present disclosure.

In another aspect, the present disclosure provides an image-enhancing convolutional neural network, trained by the method described herein. Various appropriate image-enhancing convolutional neural network may be trained by the present method. FIG. 7 is a schematic diagram illustrating the structure of an image-enhancing convolutional neural network in some embodiments according to the present disclosure. Referring to FIG. 7, the image-enhancing convolutional neural network 110 in some embodiments includes a plurality of encoding modules 1110, a plurality of decoding modules 1120, and at least one concatenation between a respective one of the plurality of encoding modules 1110 and a respective one of the plurality of decoding modules 1120. Optionally, through the at least one concatenation between the respective one of the plurality of encoding modules 1110 and the respective one of the plurality of decoding modules 1120, an output from the respective one of the plurality of encoding modules 1110 and an output from a decoding module at an immediate previous stage to the respective one of the plurality of decoding modules 1120 are concatenated as input to the respective one of the plurality of decoding modules 1120.

Figure 8:
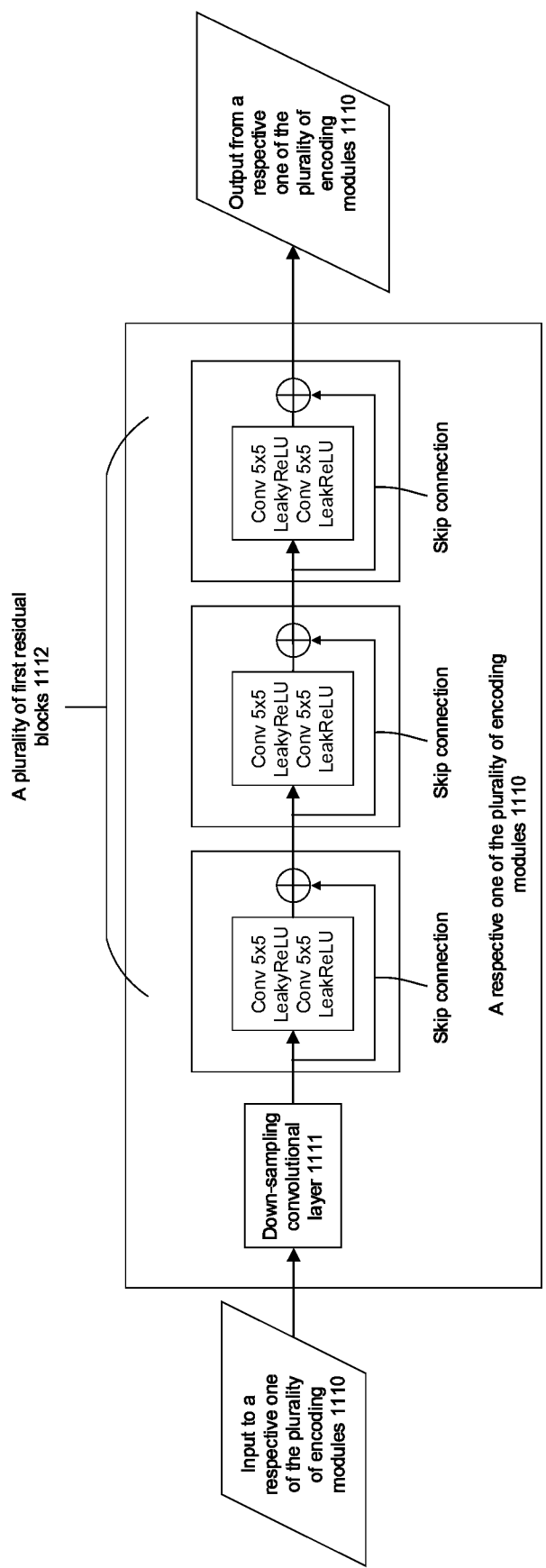
FIG. 8 is a schematic diagram illustrating the structure of a respective one of the plurality of encoding modules in some embodiments according to the present disclosure.

FIG. 8 is a schematic diagram illustrating the structure of a respective one of the plurality of encoding modules in some embodiments according to the present disclosure. Referring to FIG. 8, in some embodiments, a respective one of the plurality of encoding modules 1110 includes a down-sampling convolutional layer 1111, and a plurality of first residual blocks 1112 arranged in series. In one example, the down-sampling convolutional layer 1111 is a 2×down-sampling convolutional layer. Optionally, the down-sampling convolutional layer 1111 includes a convolutional layer (e.g., a 5*5 convolutional layer with a stride of 2) followed by a leaky rectified linear unit. Optionally, a respective one of the plurality of first residual blocks 1112 includes a convolutional layer (e.g., a 5*5 convolutional layer with a stride of 2), followed by a leaky rectified linear unit, then followed by another convolutional layer (e.g., a 5*5 convolutional layer with a stride of 2), and again followed by another leaky rectified linear unit. In some embodiments, the respective one of the plurality of first residual blocks 1112 further includes one or more skip connections for performing identity mapping.

Figure 9:
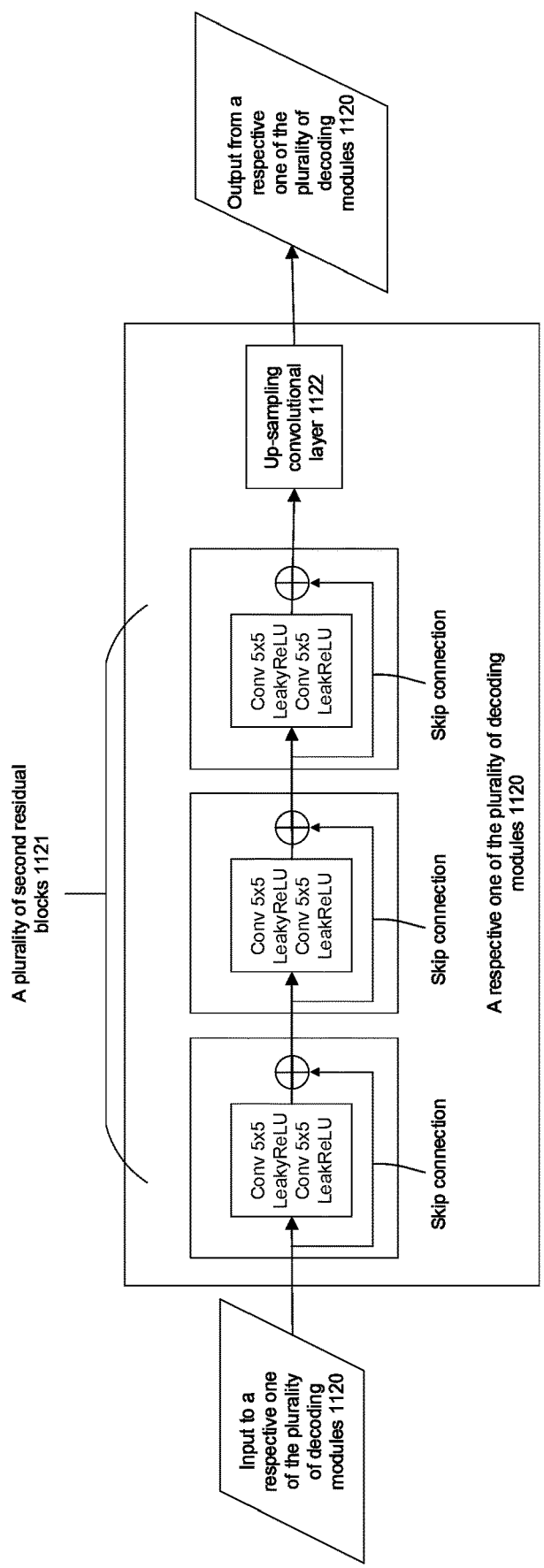
FIG. 9 is a schematic diagram illustrating the structure of a respective one of the plurality of decoding modules in some embodiments according to the present disclosure.

FIG. 9 is a schematic diagram illustrating the structure of a respective one of the plurality of decoding modules in some embodiments according to the present disclosure. Referring to FIG. 9, in some embodiments, a respective one of the plurality of decoding modules 1120 includes a plurality of second residual blocks 1121 arranged in series, and an up-sampling convolutional layer 1122. In one example, the up-sampling convolutional layer 1122 is a 2×down-sampling convolutional layer. Optionally, the up-sampling convolutional layer 1122 includes a de-convolutional layer (e.g., a 5*5 de-convolutional layer with a stride of 2) followed by a leaky rectified linear unit. Optionally, a respective one of the plurality of second residual blocks 1121 includes a convolutional layer (e.g., a 5*5 convolutional layer with a stride of 2), followed by a leaky rectified linear unit, then followed by another convolutional layer (e.g., a 5*5 convolutional layer with a stride of 2), and again followed by another leaky rectified linear unit. In some embodiments, the respective one of the plurality of second residual blocks 1121 further includes one or more skip connections for performing identity mapping.

In some embodiments, the image-enhancing convolutional neural network includes 2n number of sampling units sequentially connected; and a plurality of processing units, wherein a respective one of the plurality of processing units is between two adjacent sampling units of the 2n number of sampling units. Optionally, a first sampling unit to an n-th sample unit of the 2n number of sampling units are DeMux units, a respective one of the DeMux units is configured to rearrange pixels in a respective input image to the respective one of the DeMux units following a first scrambling rule to obtain a respective rearranged image, and configured to divide the respective rearranged image into in number of divided images. Optionally, an (n+1)-th sample unit to a (2n)-th sample unit of the 2n number of sampling units are Mux units, a respective one of the Mux units is configured to combine respective m' number of input images to the respective one of the Mux units to obtain a respective combined image, and configured to rearrange pixels of the respective combined image following a second scramble rule to obtain an output image. Optionally, the respective one of the plurality of processing units comprises a plurality of convolutional blocks sequentially connected. Optionally, m is an integer equivalent to or greater than 2, m' is an integer equivalent to or greater than 2, and n is a positive integer.

As used herein, the term "Mux unit" refers to an up-scale unit executing pixel interleaving and rearrangement on a plurality of input images, so as to obtain at least one output image having a scale greater than a scale of one of the plurality of input images. As a result, the Mux unit increases a number of pixels per image by arranging and combing pixels in the plurality of input images. Optionally, four input images INPUT 4n, INPUT 4n+1, INPUT 4n+2, and INPUT 4n+3, assuming that a number of pixels of the input images is a*b, are inputted into the Mux unit; at least one output images OUTPUT with 2a*2b pixels is outputted after pixel rearrangement processing of the Mux unit.

In one example, the four input images INPUT 4n, INPUT 4n+1, INPUT 4n+2, and INPUT 4n+3, assuming that a number of pixels of the input images is a*b, are inputted input the Mux unit; four images OUTPUT 4n, OUTPUT 4n+1, OUTPUT 4n+2 and OUTPUT 4n+3 with 2a*2b pixels are output after pixel rearrangement processing of the 2*2 MUX unit.

In another example, the four input images INPUT 4n, INPUT 4n+I, INPUT 4n+2, and INPUT 4n+3, assuming that a number of pixels of the input images is a*b, are inputted input the Mux unit; one output image OUTPUT 4n with 2a*2b pixels is outputted after pixel rearrangement processing of the Mux unit.

As used herein, the term "DeMux unit" refers to a down-scale unit executing pixel rearrangement and dividing an input image, so as to obtain a plurality of output images having a scale smaller than a scale of the input image. As a result, the DeMux unit decreases a number of pixels per image by arranging and dividing pixels in the input images into the plurality of output images. Optionally, one input images INPUT with 2a*2b pixels is inputted into the DeMux unit, four output images INPUT 4n, INPUT 4n+1, INPUT 4n+2, and INPUT 4n+3 with a*b pixels are outputted from the Demux unit.

In some embodiments, the DeMux unit is configured to rearranged pixels of a respective input image to the DeMux unit to obtain a respective rearranged image, and divide the respective rearranged image into m number of divided images (m is an integer equivalent to or greater than 2). Optionally, the pixels of the respective input image is rearranged along a first scramble rule including moving a pixel in a position A to a position B, moving a pixel previously in the position B to a position C . . . Subsequent to rearranging the pixels of the respective input image to obtain the arranged image, the rearranged image is divided into a plurality divided images.

In some embodiments, the respective input image has a spatial scale (width×height) of 4*4, subsequent to inputting the respective input image into the DeMux unit, four divided images having a spatial scale of 2*2 is output. Optionally, the pixels of the respective input image are distributed to the four divided images.

Because the scale of the divided images output from the DeMux unit is smaller than the scale of the respective input image to the DeMux unit, a process performed by the DeMux unit is a down-sampling, which can decrease the scale of the input image. At the same time, the DeMux unit merely rearrange and divide the pixels of the respective input image to the DeMux unit, and does not discard any pixel value, which will not result in any information loss.

In some embodiments, the Mux unit is configured to combining m' number of input images to the Mux unit to obtain a respective combined image, and to arranged pixels of the respective combined image following a second scramble rule to obtain an output image. Optionally, the first scrambling rule and the second scrambling rule are reverse with respect to each other. For example, the second scrambling rule includes moving a pixel in the position C to the position B, moving a pixel previously in the position B to the position . . . , thereby the pixels in the output image are respectively arranged the same position as corresponding pixels in the original image inputted into the DeMux unit.

In some embodiments, the Mux unit combines the four input images having a spatial scale of 2*2 to the Mux unit into the respective combined image having a spatial scale of 4*4. Optionally, the pixels of a respective one of the four input images is distributed to a region having a spatial scale of 2*2 respectively in the respective combined image having a spatial scale of 4*4.

Because a scale of the output image output from the Mux unit is greater than scales of m' number of input images to the Mux unit, a process performed by the Mux unit is an up-sampling, which can increase the scales of the m' number of input images. At the same time, the Mux unit merely combine and rearrange the pixels of the m' number of input images to the Mux unit, and does not discard any pixel value, which will not result in any information loss.

Various illustrative neural networks, layers, units, channels, blocks, and other operations described in connection with the configurations disclosed herein may be implemented as electronic hardware, computer software, or combinations of both. Such neural networks, layers, units, channels, blocks, and other operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented image-processing method, comprising:

inputting a first image into a trained image-enhancing convolutional neural network;

processing the first image by the trained image-enhancing convolutional neural network to obtain a second image, the second image having a sharpness greater than a sharpness of the first image;

wherein the trained image-enhancing convolutional neural network is obtained by training an image-enhancing convolutional neural network;

wherein training the image-enhancing convolutional neural network comprises:

obtaining a pair of a training image having a first degree of sharpness and a reference image having a second degree of sharpness, the second degree greater than the first degree, at least portions of the training image and the reference image in a same pair having same contents;

inputting the training image to the image-enhancing convolutional neural network to generate a training enhanced image;

inputting the training enhanced image into an edge detector;

generating, by the edge detector, a plurality of first edge maps;

inputting the reference image into the edge detector;

generating, by the edge detector, a plurality of second edge maps;

calculating one or more first losses based on the plurality of first edge maps and the plurality of second edge maps, a respective one of the one or more first losses being calculated based on a respective one of the plurality of first edge maps and a respective one of the plurality of second edge maps, the respective one of the plurality of first edge maps and the respective one of the plurality of second edge maps having a same scale;

comparing the training enhanced image with the reference image to calculate a second loss; and tuning parameters in the image-enhancing convolutional neural network to minimize at least the one or more first losses and the second loss.

2. The computer-implemented method of claim 1, wherein the edge detector is an edge detection neural network comprises N number of edge map generators respectively configured to generate N number of edge maps;

wherein a n-th edge map generator of the N number of edge map generators comprises a n-th group of convolutional layers, and a n-th side layer configured to output a n-th edge map of a same scale, $1 \le n \le N$; and when $1 \le n < N$, the n-th edge map generator further comprises a n-th down sampling layer.

3. The computer-implemented method of claim 2, wherein generating, by the edge detector, the plurality of first edge maps comprises generating a n-th first edge map of a same scale by the n-th edge map generator;

wherein generating the n-th first edge map comprises:

inputting a (n−1)-th first image into the n-th group of convolutional layers;

processing the (n−1)-th first image by the n-th group of convolutional layers to generate a n-th processed first image;

down-sampling the n-th processed first image by the n-th down-sampling layer to generate a n-th down-sampled first image;

processing the n-th processed first image by the n-th side layer to generate the n-th first edge map of the same scale; and when n<N, inputting the n-th down-sampled first image into a (n+1)-th group of convolutional layers;

wherein the (n−1)-th first image is the training enhanced image when n=1; and the (n−1)-th first image is a (n−1)-th down-sampled first image when n>1.

4. The computer-implemented method of claim 2, wherein generating, by the edge detector, the plurality of second edge maps comprises generating a n-th second edge map of a same scale by the n-th edge map generator;

wherein generating the n-th second edge map comprises:

inputting a (n−1)-th second image into the n-th group of convolutional layers;

processing the (n−1)-th second image by the n-th group of convolutional layers to generate a n-th processed second image;

down-sampling the n-th processed second image by the n-th down-sampling layer to generate a n-th down-sampled second image;

processing the n-th processed second image by the n-th side layer to generate the n-th second edge map of the same scale; and when n<N, inputting the n-th down-sampled second image into a (n+1)-th group of convolutional layers;

wherein the (n−1)-th second image is the reference image when n=1; and the (n−1)-th second image is a (n−1)-th down-sampled second image when n>1.

5. The computer-implemented method of claim 2, wherein the n-th group of convolutional layers comprises multiple convolutional layers and multiple active layers, each of the multiple convolutional layers comprises (p×64) number of 3×3 convolutional kernels, p being a positive integer; and the n-th side layer comprises a convolutional layer and a deconvolutional layer sequentially connected.

6. The computer-implemented method of claim 1, wherein the edge detector is an edge detection neural network comprising:

a first group of convolutional layers, a first pooling layer, a first side layer, a second group of convolutional layers, a second pooling layer, a second side layer, a third group of convolutional layers, a third pooling layer, a third side layer, a fourth group of convolutional layers, a fourth pooling layer, a fourth side layer, a fifth group of convolutional layers, and a fifth side layer;

wherein the first group of convolutional layers comprises two convolutional layers and two active layers, each of the two convolutional layers comprises 64 number of 3×3 convolutional kernels;

the second group of convolutional layers comprises two convolutional layers and two active layers, each of the two convolutional layers comprises 128 number of 3×3 convolutional kernels;

the third group of convolutional layers comprises three convolutional layers and three active layers, each of the three convolutional layers comprises 256 number of 3×3 convolutional kernels;

the fourth group of convolutional layers comprises three convolutional layers and three active layers, each of the three convolutional layers comprises 512 number of 3×3 convolutional kernels; and the fifth group of convolutional layers comprises three convolutional layers and three active layers, each of the three convolutional layers comprises 512 number of 3×3 convolutional kernels.

7. The computer-implemented method of claim 1, wherein calculating the one or more first losses based on the plurality of first edge maps and the plurality of second edge maps comprises calculating a n-th loss based on a n-th first edge map of a same scale and a n-th second edge map of a same scale, $1 \leq n \leq N$.

8. The computer-implemented method of claim 7, wherein the one or more first losses comprises $\Sigma_L^N Loss_n$;

wherein $Loss_n$ stands for the n-th loss.

9. The computer-implemented method of claim 7, wherein calculating the n-th loss comprises calculating one or more of a L2 loss, a L1 loss, and a MSE loss;

wherein the L2 loss is calculated using a L2 loss function expressed as:

$$sum(|Y-f(x)|^2);$$

wherein Y stands for a value of a pixel in the n-th second edge map, f(x) stands for a value of a pixel in the n-th first edge map, and sum stands for a summation operation.

10. The computer-implemented method of claim 7, wherein calculating the n-th loss comprises calculating one or more of a L2 loss, a L1 loss, and a MSE loss;

wherein the L1 loss is calculated using a L1 loss function expressed as:

$$sum(|Y-f(x)|^2);$$

wherein Y stands for a value of a pixel in the n-th second edge map, f(x) stands for a value of a pixel in the n-th first edge map, and sum stands for a summation operation.

11. The computer-implemented method of claim 7, wherein calculating the n-th loss further comprises calculating one or more of a L2 loss, a L1 loss, and a MSE loss;

wherein the MSE loss is calculated using a MSE loss function expressed as:

$$avg(|Y-f(x)|^2);$$

wherein Y stands for a value of a pixel in the n-th second edge map, f(x) stands for a value of a pixel in the n-th first edge map, and avg stands for an averaging operation.

12. The computer-implemented method of claim 1, wherein calculating the second loss comprises calculating one or more of a L2 loss, a L1 loss, and a MSE loss;

wherein the L2 loss is calculated using a L2 loss function expressed as:

$$sum(|Y-f(x)|^2);$$

wherein Y stands for a value of a pixel in the reference image, f(x) stands for a value of a pixel in the training enhanced image, and sum stands for a summation operation.

13. The computer-implemented method of claim 1, wherein calculating the second loss comprises calculating one or more of a L2 loss, a L1 loss, and a MSE loss;

wherein the L1 loss is calculated using a L1 loss function expressed as:

$$sum(|Y-f(x)|^2);$$

wherein Y stands for a value of a pixel in the reference image, f(x) stands for a value of a pixel in the training enhanced image, and sum stands for a summation operation.

14. The computer-implemented method of claim 1, wherein calculating the second loss comprises calculating one or more of a L2 loss, a L1 loss, and a MSE loss;

wherein the MSE loss is calculated using a MSE loss function expressed as:

$$\text{avg}(|Y-f(x)|^2);$$

wherein Y stands for a value of a pixel in the reference image, f (x) stands for a value of a pixel in the training enhanced image, and sum stands for a summation operation.

15. The computer-implemented method of claim 1, further comprising reiterating training the image-enhancing convolutional neural network using a different pair of a training image and a reference image.

16. An image-enhancing convolutional neural network, trained by:
  obtaining a pair of a training image having a first degree of sharpness and a reference image having a second degree of sharpness, the second degree greater than the first degree, at least portions of the training image and the reference image in a same pair having same contents;
  inputting the training image to the image-enhancing convolutional neural network to generate a training enhanced image;
  inputting the training enhanced image into an edge detector;
  generating, by the edge detector, a plurality of first edge maps;
  inputting the reference image into the edge detector;
  generating, by the edge detector, a plurality of second edge maps;
  calculating one or more first losses based on the plurality of first edge maps and the plurality of second edge maps, a respective one of the one or more first losses being calculated based on a respective one of the plurality of first edge maps and a respective one of the plurality of second edge maps, the respective one of the plurality of first edge maps and the respective one of the plurality of second edge maps having a same scale;
  comparing the training enhanced image with the reference image to calculate a second loss; and
  tuning parameters in the image-enhancing convolutional neural network to minimize at least the one or more first losses and the second loss.

17. The image-enhancing convolutional neural network of claim 16, comprising:
  a plurality of encoding modules;
  a plurality of decoding modules; and
  at least one concatenation between a respective one of the plurality of encoding modules and a respective one of the plurality of decoding modules;
  wherein a respective one of the plurality of encoding modules comprises a down-sampling convolutional layer, and a plurality of first residual blocks arranged in series;
  a respective one of the plurality of decoding modules comprises a plurality of second residual blocks arranged in series, and an up-sampling convolutional layer.

18. A computer-program product, for training an image-enhancing convolutional neural network configured to enhance an original image, comprising a non-transitory tangible computer-readable medium having computer-readable instructions thereon, the computer-readable instructions being executable by a processor to cause the processor to perform:
  obtaining a pair of a training image having a first degree of sharpness and a reference image having a second degree of sharpness, at least portions of the training image and the reference image in a same pair having same contents;
  inputting the training image to the image-enhancing convolutional neural network to generate a training enhanced image;
  inputting the training enhanced image into an edge detector;
  generating, by the edge detector, a plurality of first edge maps;
  inputting the reference image into the edge detector;
  generating, by the edge detector, a plurality of second edge maps;
  calculating one or more first losses based on the plurality of first edge maps and the plurality of second edge maps, a respective one of the one or more first losses being calculated based on a respective one of the plurality of first edge maps and a respective one of the plurality of second edge maps, the respective one of the plurality of first edge maps and the respective one of the plurality of second edge maps having a same scale; and
  tuning parameters in the image-enhancing convolutional neural network to minimize at least the one or more first losses.

* * * * *